(12) United States Patent
Wentink et al.

(10) Patent No.: US 9,179,300 B2
(45) Date of Patent: Nov. 3, 2015

(54) STATION-CENTRIC MULTI-USER MULTIPLE INPUT MULTIPLE OUTPUT (MU-MIMO)

(75) Inventors: Maarten Menzo Wentink, Naarden (NL); Didier Johannes Richard Van Nee, De Meern (NL); Sameer Vermani, San Diego, CA (US); Simone Merlin, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/409,948

(22) Filed: Mar. 1, 2012

(65) Prior Publication Data

US 2013/0058273 A1 Mar. 7, 2013

Related U.S. Application Data

(60) Provisional application No. 61/448,484, filed on Mar. 2, 2011.

(51) Int. Cl.
| | |
|---|---|
| *H04W 8/26* | (2009.01) |
| *H04B 7/04* | (2006.01) |
| *H04W 8/20* | (2009.01) |
| *H04W 8/18* | (2009.01) |

(52) U.S. Cl.
CPC ............... *H04W 8/26* (2013.01); *H04B 7/0452* (2013.01); *H04W 8/186* (2013.01); *H04W 8/205* (2013.01)

(58) Field of Classification Search
CPC .............. H04L 63/0428; H04L 69/329; H04L 63/0272; H04L 2463/101; H04L 2463/102; H04L 67/02; H04L 67/18; H04L 67/306; H04L 67/10; H04L 29/06; H04L 65/1069; H04L 12/1859; H04L 67/20; H04L 69/04
USPC .......................... 370/328, 338, 252, 311, 390
See application file for complete search history.

(56) References Cited

U.S. PATENT DOCUMENTS

| | | | |
|---|---|---|---|
| 8,254,244 B2 | 8/2012 | Montojo et al. | |
| 8,412,222 B2 | 4/2013 | Agrawal et al. | |
| 8,477,779 B1 * | 7/2013 | Colloff et al. | 370/390 |

(Continued)

FOREIGN PATENT DOCUMENTS

| | | |
|---|---|---|
| EP | 2109243 A1 | 10/2009 |
| JP | 2006094484 A | 4/2006 |

(Continued)

OTHER PUBLICATIONS 802-11ac-mac-frame-length-indication, 2010.*

(Continued)

*Primary Examiner* — Un C Cho
*Assistant Examiner* — Oussama Roudani
(74) *Attorney, Agent, or Firm* — Dang M. Vo

(57) ABSTRACT

Certain aspects of the present disclosure provide techniques and apparatus for using a Media Access Control (MAC) address of a station (STA) sending a direct link multi-user multiple-input multiple-output (MU-MIMO) transmission such that one or more STAs receiving the transmission may interpret a group identifier (ID) indicating a group to which the STAs belong. Using the group ID and the MAC address allows a STA to independently manage its group IDs, independent of an access point (AP) or other STAs in a Basic Service Set (BSS).

40 Claims, 14 Drawing Sheets

(56) References Cited

U.S. PATENT DOCUMENTS

| | | | |
|---|---|---|---|
| 8,681,815 B1* | 3/2014 | Liu et al. | 370/473 |
| 2006/0248429 A1 | 11/2006 | Grandhi et al. | |
| 2007/0230373 A1 | 10/2007 | Li et al. | |
| 2008/0062948 A1 | 3/2008 | Ponnuswamy | |
| 2010/0014434 A1 | 1/2010 | Reznik et al. | |
| 2010/0075703 A1 | 3/2010 | Imai et al. | |
| 2010/0177755 A1* | 7/2010 | Chu et al. | 370/338 |
| 2010/0322166 A1 | 12/2010 | Sampath et al. | |
| 2011/0038332 A1 | 2/2011 | Liu et al. | |
| 2011/0069648 A1 | 3/2011 | Lee et al. | |
| 2011/0090855 A1 | 4/2011 | Kim | |
| 2011/0128947 A1* | 6/2011 | Liu et al. | 370/338 |
| 2011/0150004 A1* | 6/2011 | Denteneer et al. | 370/476 |
| 2011/0188598 A1 | 8/2011 | Lee et al. | |
| 2011/0194644 A1 | 8/2011 | Liu et al. | |
| 2011/0205968 A1 | 8/2011 | Kim et al. | |
| 2011/0222478 A1 | 9/2011 | Lee et al. | |
| 2011/0235593 A1 | 9/2011 | Gong et al. | |
| 2011/0261708 A1* | 10/2011 | Grandhi | 370/252 |
| 2011/0261742 A1 | 10/2011 | Wentink | |
| 2011/0286377 A1 | 11/2011 | Sampath et al. | |
| 2012/0218982 A1* | 8/2012 | Lee et al. | 370/338 |
| 2013/0070670 A1 | 3/2013 | Wentink | |

FOREIGN PATENT DOCUMENTS

| | | |
|---|---|---|
| JP | 2007166464 A | 6/2007 |
| JP | 2008527838 A | 7/2008 |
| JP | 2010166401 A | 7/2010 |
| JP | 2011019262 A | 1/2011 |
| WO | WO-2008024544 A2 | 2/2008 |
| WO | WO-2008027672 A2 | 3/2008 |
| WO | 2008093619 A1 | 8/2008 |
| WO | 2009058809 | 5/2009 |
| WO | WO-2009113834 A2 | 9/2009 |
| WO | WO-2011005004 A2 | 1/2011 |
| WO | 2011025769 A1 | 3/2011 |

OTHER PUBLICATIONS 802-11ac-preamble, 2010.*

IEEE 802.11-2007, "IEEE Standard for Information Technology—Telecommunications and Information Exchange Between Systems—Local and Metropolitan Area Networks—Specific Requirements", Part 11: Wireless LAN Medium Access Control (MAC) and Physical Layer (PHY) Specifications, (Jun. 12, 2007).

IEEE P802.11ac/D0.1, Draft Standard for Information Technology—Telecommunications and information exchange between systems—Local and metropolitan area networks—Specific requirements Part 11 : Wireless LAN Medium Access Control (MAC) and Physical Layer (PHY) specifications. Amendment 5: Enhancements for Very High Throughput for Operation in Bands below 6 GHz, Jan. 2011, pp. 1-193.

IEEE P802.11z/D7.0, Draft Standard for Information Technology—Telecommunications and information exchange between systems—Local and metropolitan area networks—Specfic requirements—Part 11: Wireless LAN Medium Access Control (MAC) and Physical Layer (PHY) specifications, Amendment 6: Extensions to Direct Link Setup (DLS), Feb. 2010.

International Search Report and Written Opinion—PCT/US2012/027611—ISA/EPO—Jun. 22, 2012.

* cited by examiner

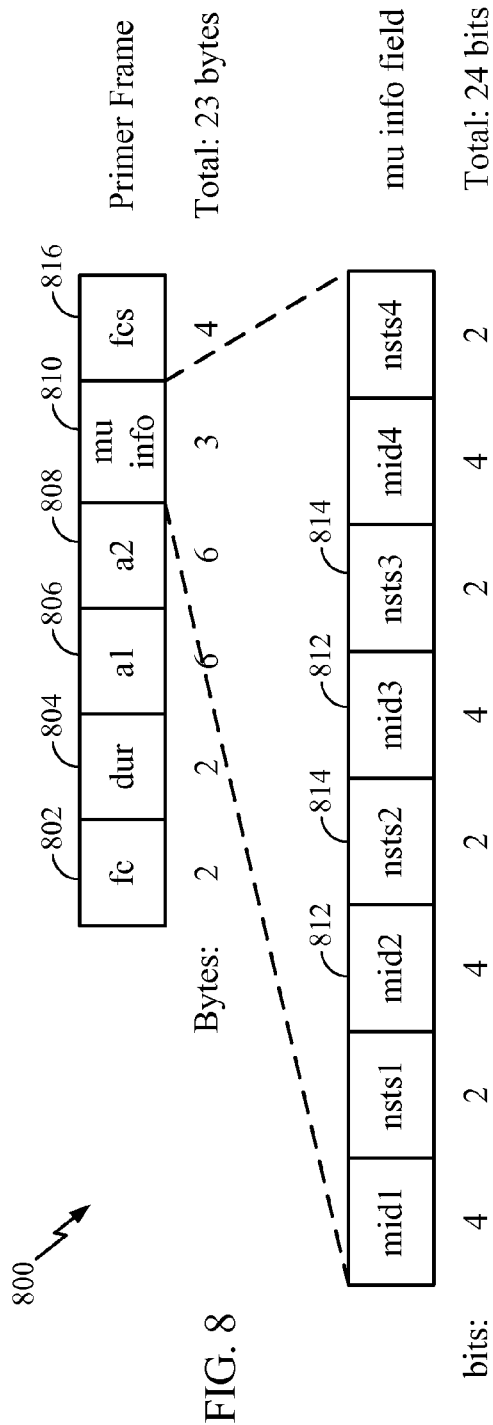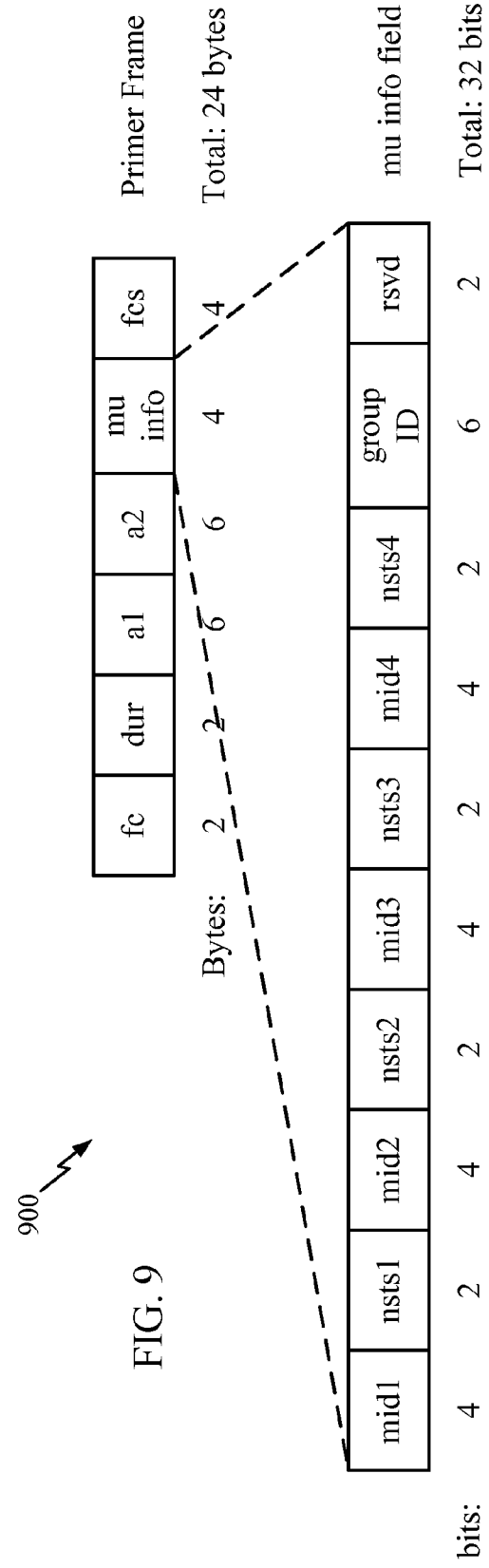
FIG. 8
FIG. 9

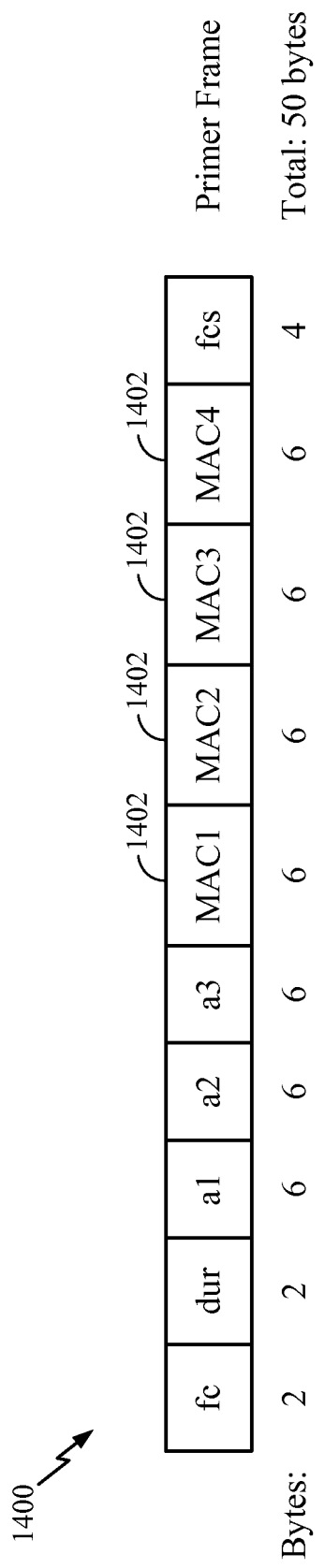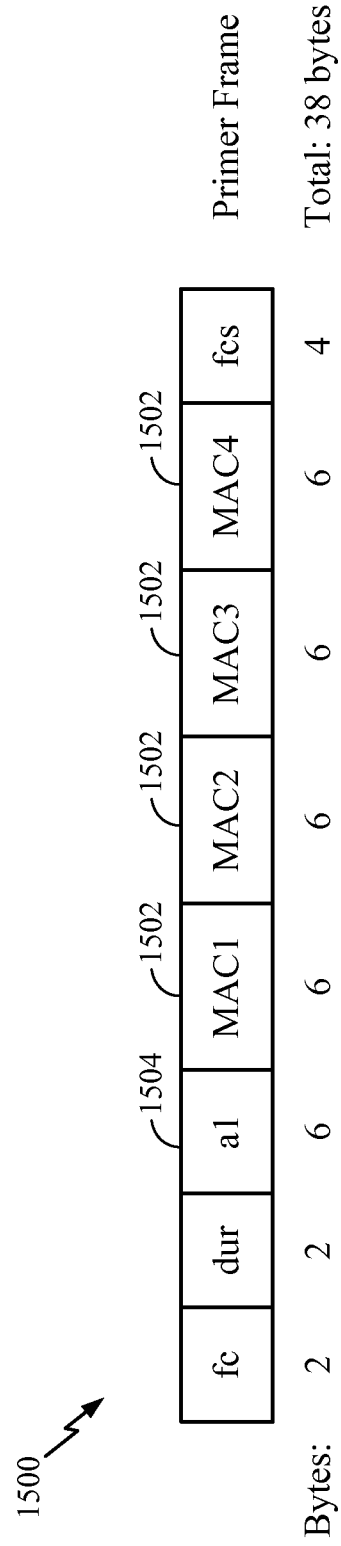

STATION-CENTRIC MULTI-USER MULTIPLE INPUT MULTIPLE OUTPUT (MU-MIMO)

CROSS-REFERENCE TO RELATED APPLICATIONS

This application claims benefit of U.S. Provisional Patent Application Ser. No. 61/448,484, filed Mar. 2, 2011, which is herein incorporated by reference.

BACKGROUND

1. Field of the Invention

Certain aspects of the present disclosure generally relate to wireless communications and, more particularly, to using a Media Access Control (MAC) address of a station (STA) sending a direct link multi-user multiple-input multiple-output (MU-MIMO) transmission such that one or more STAs receiving the transmission may interpret a group identifier (ID) indicating a group to which the STAs belong.

2. Relevant Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

A MIMO wireless system employs a number ($N_T$) of transmit antennas and a number ($N_R$) of receive antennas for data transmission. A MIMO channel formed by the $N_T$ transmit and $N_R$ receive antennas may be decomposed into a number of ($N_S$) of independent channels, which are also referred to as spatial channels or spatial streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single access point (AP) and multiple user stations (STAs), concurrent transmissions may occur on multiple channels toward different stations, both in the uplink and downlink direction. Many challenges are present in such systems.

SUMMARY

Certain aspects of the present disclosure generally apply to a wireless local area network (WLAN) where a station (STA) has data to send to a plurality of other stations (STAs). By using the Spatial Division Multiple Access (SDMA) technique, for example, a STA capable of direct link transmission may simultaneously send data towards multiple STAs. Certain aspects of the present disclosure generally relate to using a Media Access Control (MAC) address of a STA sending a direct link multi-user multiple-input multiple-output (MU-MIMO) transmission such that one or more STAs receiving the transmission may interpret a group identifier (ID) indicating a group to which the STAs belong. Using the group ID and the MAC address allows a STA to independently manage its group IDs, independent of an access point (AP) or other STAs in a Basic Service Set (BSS).

Certain aspects of the present disclosure provide a first apparatus for wireless communications. The first apparatus generally includes a processing system configured to determine a MAC address of the first apparatus and a transmitter. The transmitter is typically configured to transmit a multi-user (MU) packet to one or more second apparatuses, wherein the MU packet comprises an indication of a group ID indicating a group to which the second apparatuses belong, and to transmit an indication of the MAC address of the first apparatus to the second apparatuses for interpretation of the group ID by the second apparatuses based on the MAC address.

Certain aspects of the present disclosure provide a method for wireless communications. The method generally includes determining a MAC address of a first apparatus; transmitting a MU packet to one or more second apparatuses, wherein the MU packet comprises an indication of a group ID indicating a group to which the second apparatuses belong; and transmitting an indication of the MAC address of the first apparatus to the second apparatuses for interpretation of the group ID by the second apparatuses based on the MAC address.

Certain aspects of the present disclosure provide a first apparatus for wireless communications. The first apparatus generally includes means for determining a MAC address of the first apparatus and means for transmitting a MU packet to one or more second apparatuses, wherein the MU packet comprises an indication of a group ID indicating a group to which the second apparatuses belong and wherein the means for transmitting is also configured to transmit an indication of the MAC address of the first apparatus to the second apparatuses for interpretation of the group ID by the second apparatuses based on the MAC address.

Certain aspects of the present disclosure provide a computer-program product for wireless communications. The computer-program product generally includes a computer-readable medium having instructions executable to determine a MAC address of a first apparatus; to transmit a MU packet to one or more second apparatuses, wherein the MU packet comprises an indication of a group ID indicating a group to which the second apparatuses belong; and to transmit an indication of the MAC address of the first apparatus to the second apparatuses for interpretation of the group ID by the second apparatuses based on the MAC address.

Certain aspects of the present disclosure provide a wireless node. The wireless node generally includes at least one antenna, a processing system configured to determine a MAC address of the wireless node, and a transmitter. The transmitter is typically configured to transmit, via the at least one antenna, a MU packet to one or more apparatuses, wherein the MU packet comprises an indication of a group ID indicating a group to which the apparatuses belong; and to transmit, via the at least one antenna, an indication of the MAC address of the wireless node to the apparatuses for interpretation of the group ID by the apparatuses based on the MAC address.

Certain aspects of the present disclosure provide a first apparatus for wireless communications. The first apparatus generally includes a receiver and a processing system. The receiver is typically configured to receive a MU packet from a second apparatus, wherein the MU packet comprises an indication of a group ID indicating a group to which the first apparatus belongs and to receive an indication of a MAC address of the second apparatus. The processing system is typically configured to interpret the group ID based on the MAC address. For certain aspects, the receiver is configured to receive a message from the second apparatus, the message indicating assignment of the first apparatus to the group and indicating, for the group ID, a spatial stream for the first apparatus in MU packets transmitted to the group from the second apparatus. For certain aspects, the processing system is configured to interpret the group ID by determining that the MAC address is associated with the second apparatus, such that the MU packet was transmitted by the second apparatus and the group ID is associated with the second apparatus.

Certain aspects of the present disclosure provide a method for wireless communications. The method generally includes receiving, at a first apparatus, a MU packet from a second apparatus, wherein the MU packet comprises an indication of a group ID indicating a group to which the first apparatus belongs; receiving an indication of a MAC address of the second apparatus; and interpreting the group ID based on the MAC address.

Certain aspects of the present disclosure provide a first apparatus for wireless communications. The first apparatus generally includes means for receiving a MU packet from a second apparatus, wherein the MU packet comprises an indication of a group ID indicating a group to which the first apparatus belongs and wherein the means for receiving is also configured to receive an indication of a MAC address of the second apparatus; and means for interpreting the group ID based on the MAC address.

Certain aspects of the present disclosure provide a computer-program product for wireless communications. The computer-program product generally includes a computer-readable medium having instructions executable to receive, at a first apparatus, a MU packet from a second apparatus, wherein the MU packet comprises an indication of a group ID indicating a group to which the first apparatus belongs; receive an indication of a MAC address of the second apparatus; and interpret the group ID based on the MAC address.

Certain aspects of the present disclosure provide a wireless node. The wireless node generally includes at least one antenna; a receiver configured to receive, via the at least one antenna, a MU packet from an apparatus, wherein the MU packet comprises an indication of a group ID indicating a group to which the wireless node belongs and to receive, via the at least one antenna, an indication of a MAC address of the apparatus; and a processing system configured to interpret the group ID based on the MAC address.

Certain aspects of the present disclosure provide a first apparatus for wireless communications. The first apparatus generally includes a transmitter and a processing system configured to determine a group of one or more second apparatuses. The transmitter is typically configured to transmit a MU packet to the one or more second apparatuses and to transmit an indication to temporarily assign the second apparatuses to the group.

Certain aspects of the present disclosure provide a method for wireless communications. The method generally includes determining, at a first apparatus, a group of one or more second apparatuses; transmitting a MU packet to the one or more second apparatuses; and transmitting an indication to temporarily assign the second apparatuses to the group.

Certain aspects of the present disclosure provide a first apparatus for wireless communications. The first apparatus generally includes means for determining a group of one or more second apparatuses, and means for transmitting configured to transmit a MU packet to the one or more second apparatuses, wherein the means for transmitting is also configured to transmit an indication to temporarily assign the second apparatuses to the group.

Certain aspects of the present disclosure provide a computer-program product for wireless communications. The computer-program product generally includes a computer-readable medium having instructions executable to determine, at a first apparatus, a group of one or more second apparatuses; to transmit a MU packet to the one or more second apparatuses; and to transmit an indication to temporarily assign the second apparatuses to the group.

Certain aspects of the present disclosure provide a wireless node. The wireless node generally includes at least one antenna, a transmitter, and a processing system configured to determine a group of one or more apparatuses. The transmitter is typically configured to transmit, via the at least one antenna, a MU packet to the one or more apparatuses and to transmit, via the at least one antenna, an indication to temporarily assign the apparatuses to the group.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 8 illustrates an example primer frame using a MU identifier (MID) for each of the STAs addressed in the MU packet, in accordance with certain aspects of the present disclosure.

FIG. 9 illustrates an example primer frame for announcing a temporary group identifier (ID) and group assignment, in accordance with certain aspects of the present disclosure.

FIG. 14 illustrates an example primer frame using Media Access Control (MAC) addresses for a group ID assignment, in accordance with certain aspects of the present disclosure.

FIG. 15 illustrates a more efficient primer frame using MAC addresses than that of FIG. 14, in accordance with certain aspects of the present disclosure.

DETAILED DESCRIPTION

Figure 1:
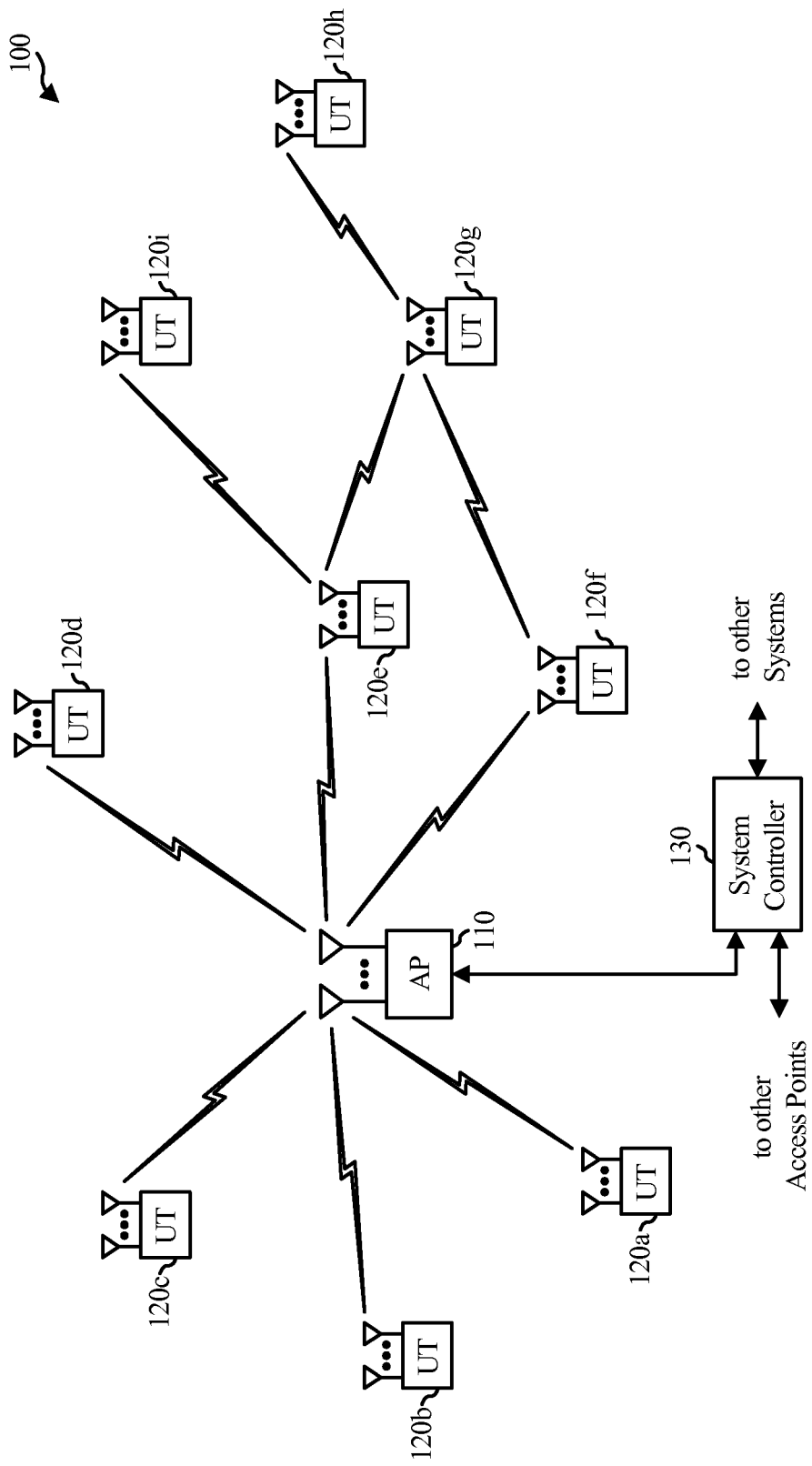
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support the Institute of Electrical and Electronics Engineers (IEEE) 802.11n or earlier amendments to the IEEE 802.11 standard.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to a different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point (AP) may comprise, be implemented as, or known as a Node B, Radio Network Controller (RNC), evolved Node B (eNB), Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

An access terminal (AT) may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol (SIP) phone, a wireless local loop (WLL) station, a personal digital assistant (PDA), a handheld device having wireless connection capability, a station (STA), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a station (STA), a client, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
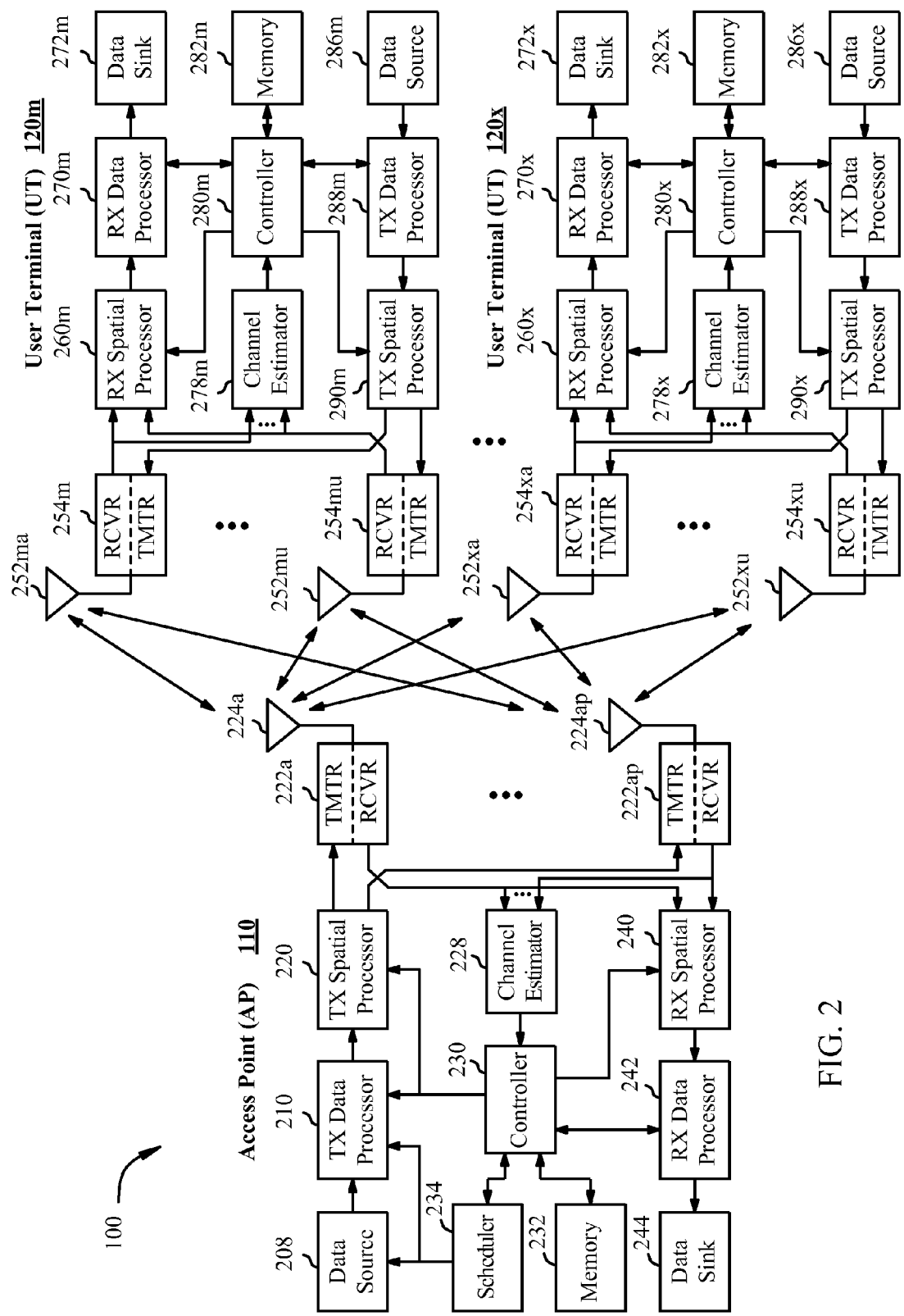
FIG. 2 illustrates a block diagram of an example access point (AP) and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as precoding or beamforming) on the $N_{dn}$ downlink data symbol streams and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves, and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
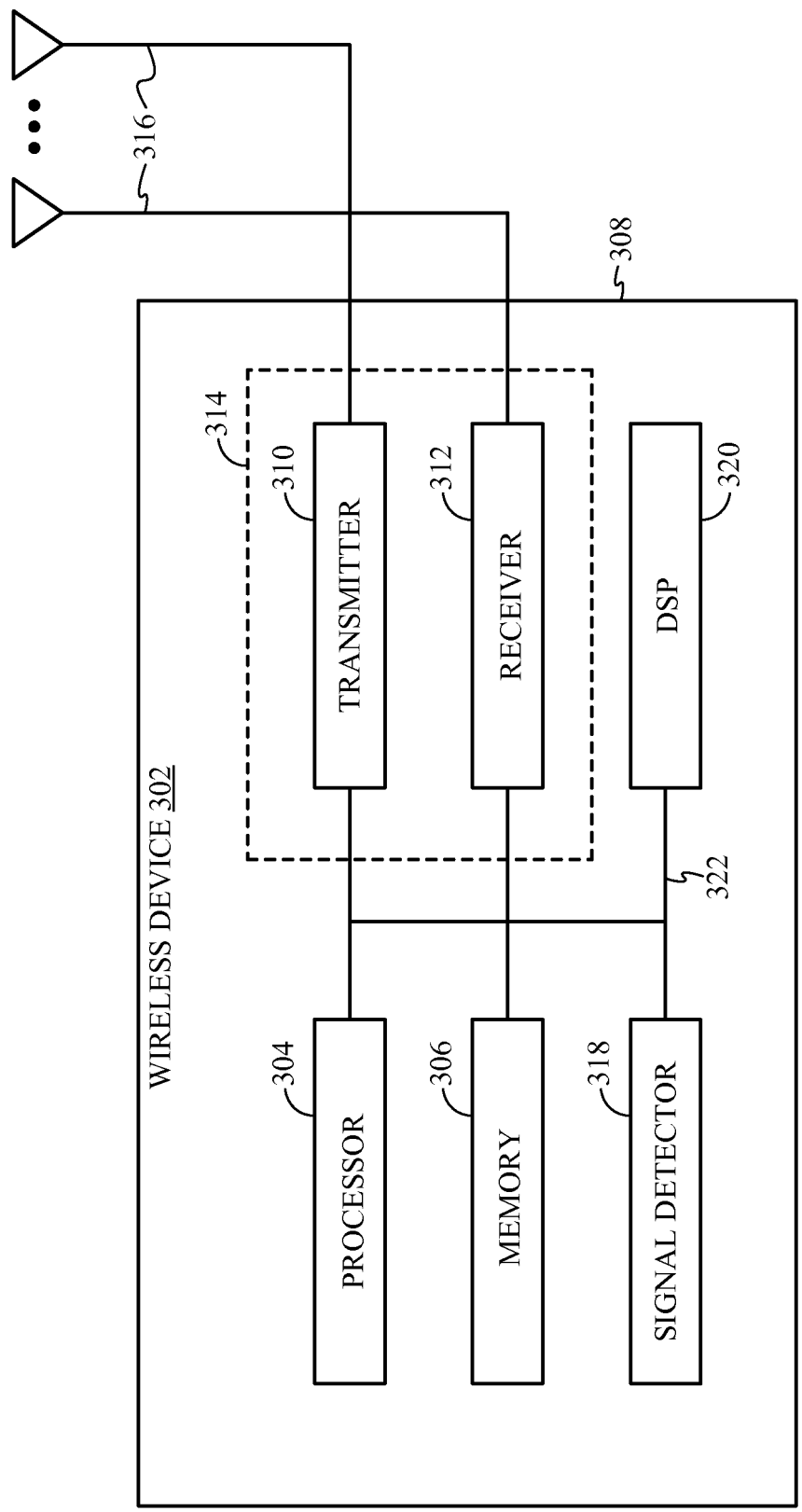
FIG. 3 illustrates a block diagram of an example wireless device in accordance with certain aspects of the present disclosure.

FIG. 3 illustrates various components that may be utilized in a wireless device 302 that may be employed within a wireless communication system, such as the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Preamble Structure with Group Definition

In next generation WLANs, such as the system 100 from FIG. 1, downlink (DL) multi-user (MU) MIMO transmission may represent a promising technique to increase overall network throughput. In most aspects of a DL MU-MIMO transmission, a non-beamformed portion of a preamble transmitted from an access point to a plurality of user stations (STAs) may carry a spatial stream allocation field indicating allocation of spatial streams to the STAs.

Figure 4:
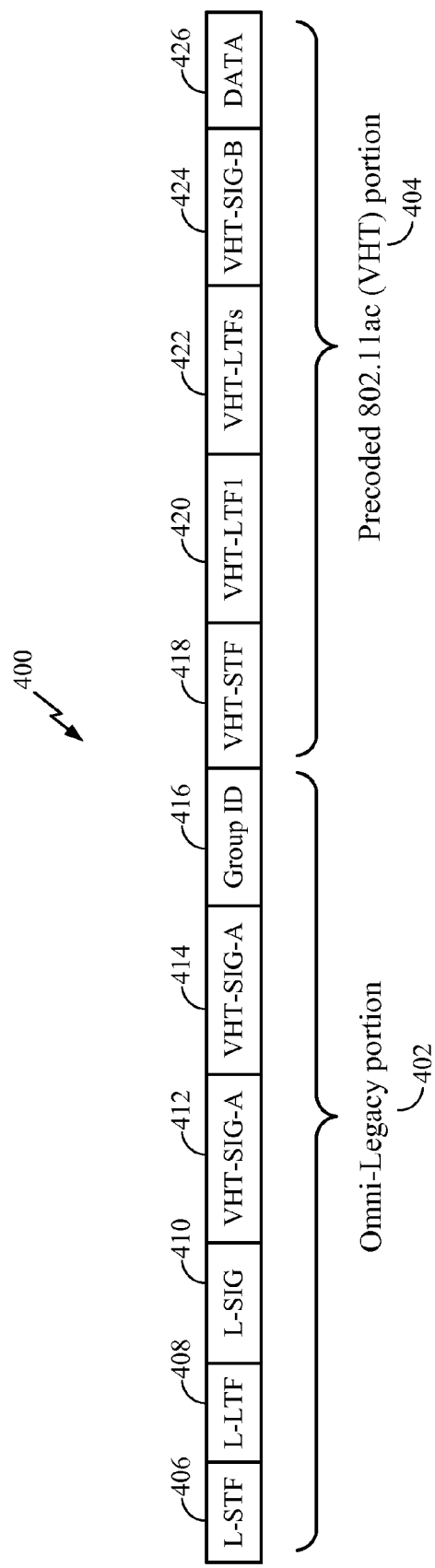
FIG. 4 illustrates an example structure of a preamble in accordance with certain aspects of the present disclosure.

In order to parse this allocation information at a STA, each STA may be informed of its ordering or a STA number in a set of STAs from the plurality of STAs scheduled to receive the MU transmission. This may entail forming groups, wherein a group identifier (group ID) field in the preamble may convey, to the STAs, the set of STAs (and their order) being transmitted in a given MU transmission. With preamble bits adding to the transmission overhead, it may be desirable to expend as little bits on the group ID as possible, while not sacrificing on the flexibility with which STAs can be scheduled together in a MU-MIMO transmission at a given instant. FIG. 4 illustrates an example structure of a preamble 400 in accordance with certain aspects of the present disclosure. The preamble 400 may be transmitted, for example, from the access point (AP) 110 to the user terminals 120 in the system 100 illustrated in FIG. 1. For certain aspects, the preamble 400 may also be transmitted from one STA to one or more other STAs using direct link transmission.

The preamble 400 may comprise an omni-legacy portion 402 (i.e., the non-beamformed portion) and a precoded 802.11ac VHT (Very High Throughput) portion 404. The legacy portion 402 may comprise: a Legacy Short Training Field (L-STF) 406, a Legacy Long Training Field 408, a Legacy Signal (L-SIG) field 410, and two OFDM symbols for VHT Signal A (VHT-SIG-A) fields 412, 414. The VHT-SIG-A fields 412, 414 may be transmitted omni-directionally and may indicate allocation of numbers of spatial streams to a combination (set) of STAs.

The precoded 802.11ac VHT portion 404 may comprise a Very High Throughput Short Training Field (VHT-STF) 418, a Very High Throughput Long Training Field 1 (VHT-LTF1) 420, Very High Throughput Long Training Fields (VHT-LTFs) 422, a Very High Throughput Signal B (VHT-SIG-B) field 424, and a data portion 426. The VHT-SIG-B field may comprise one OFDM symbol and may be transmitted precoded/beamformed.

Robust MU-MIMO reception may involve the AP transmitting all VHT-LTFs 422 to all supported STAs. The VHT-LTFs 422 may allow each STA to estimate a MIMO channel from all AP antennas to the STA's antennas. The STA may utilize the estimated channel to perform effective interference nulling from MU-MIMO streams corresponding to other STAs. To perform robust interference cancellation, each STA may be expected to know which spatial stream belongs to that STA, and which spatial streams belong to other users.

As aforementioned, a group ID field 416 may be included in the preamble 400 to convey to all supported STAs that a particular set of STAs will be receiving spatial streams of a MU-MIMO transmission. As a baseline, if groups are formed which may be mapped to unique sets of STAs, a very large number of group ID bits within the preamble 400 may be involved for complete scheduling flexibility. On the other hand, if overloading of a group ID is allowed where multiple sets (combinations) of STAs may be mapped to one group ID, greater flexibility may be achieved in the number of STAs that can be scheduled together.

Example STA-Centric MU-MIMO

As described above, groups may be formed in DL MU-MIMO transmission for WLANs for conveying the spatial stream positions to STAs. MU-MIMO, as defined in IEEE 802.11ac, may be used to beamform data packets to multiple receivers in parallel. Prior to the IEEE 802.11ac amendment, data transmissions could be beamformed to individual receivers, but only sequentially and not in parallel.

The physical layer (PHY) header of a MU-MIMO packet (i.e., a packet to multiple destinations) may contain an indication of a group identifier (group ID), which specifies to which STAs the MU-MIMO packet is destined and on which spatial stream(s) each receiving STA should listen. Currently, the mapping between the group ID and the addressed set of STAs is controlled by the AP and distributed to the STAs via management frames. This implies that STAs cannot reliably use MU-MIMO on direct link transmissions to other STAs, because the STAs have no access to group ID assignments.

Figure 5:
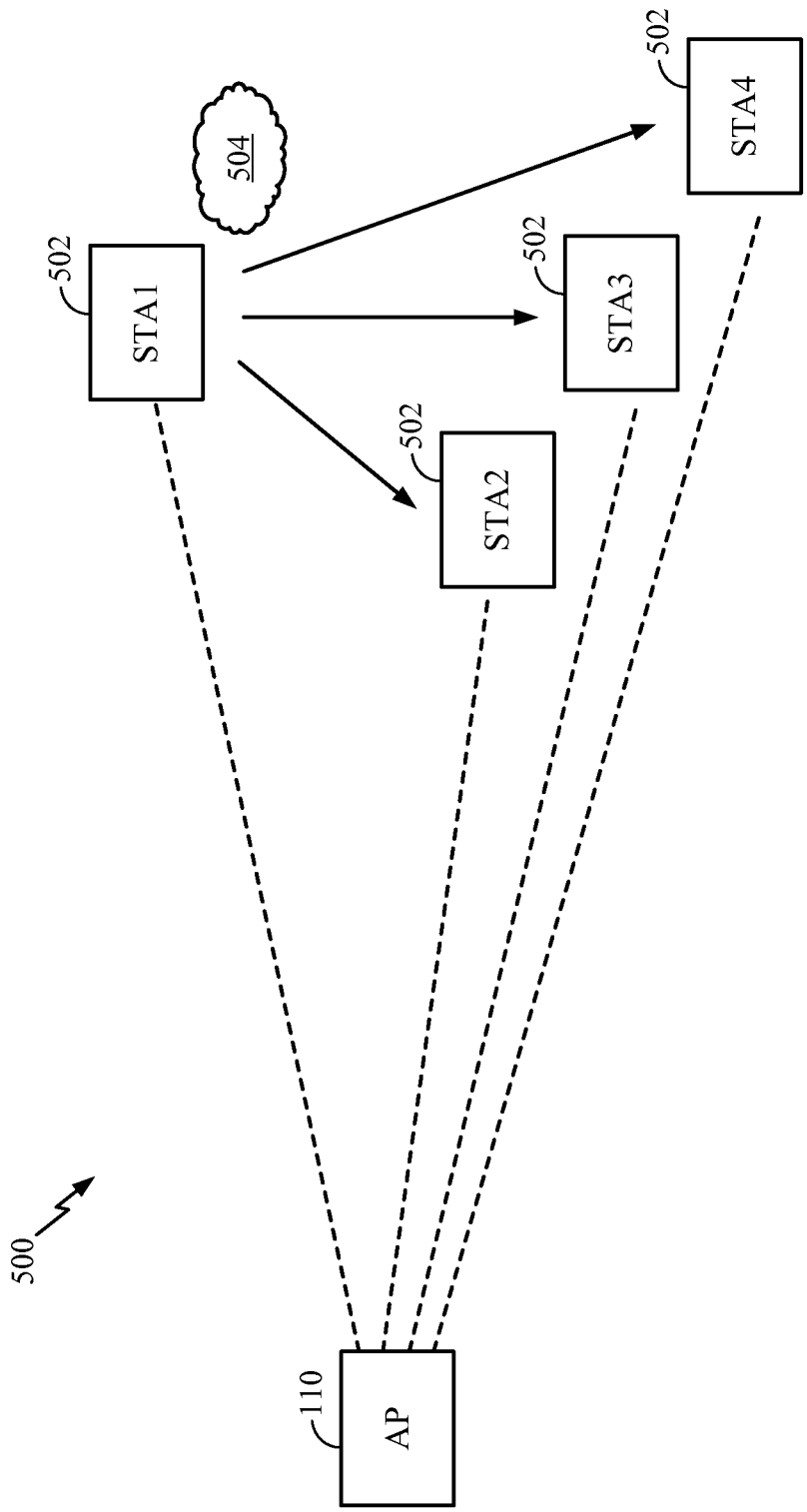
FIG. 5 illustrates a diagram of a multi-user multiple-input multiple output (MU-MIMO) network capable of direct link transmission between stations (STAs), in accordance with certain aspects of the present disclosure.

FIG. 5 illustrates a diagram of a MU-MIMO network 500 capable of direct link transmission between STAs 502, rather than downlink or uplink transmissions between the AP 110 and the STAs 502. In FIG. 5, STA1 is capable of transmitting a direct link MU packet 504 intended for STA2, STA3, and STA4. Direct link connections between STAs that are associated with the same Basic Service Set (BSS) may be set up using the Tunneled Direct Link Setup (TDLS) protocol, for example. TDLS is defined in the IEEE 802.11z amendment to the IEEE 802.11 standard.

Accordingly, what is needed are techniques and apparatus to interpret the context of a group ID when direct link MU-MIMO transmission is used.

To solve this problem, the group ID in a multi-user (MU) packet may be combined with the Media Access Control (MAC) address of the STA sending the MU packet. The MAC address is a unique identifier of the STA, which therefore unambiguously provides the context in which the group ID should be interpreted. Combining the group ID with the MAC address allows STAs to independently manage their group IDs, independently of the AP and of other STAs in the BSS. Group ID assignment messages may be encapsulated in TDLS frames so that a STA may send updates to related peer STAs autonomously (i.e., without relying on an AP to perform this function).

Figure 6:
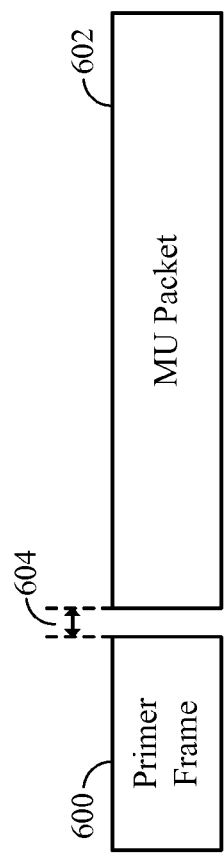
FIG. 6 illustrates a primer frame preceding a multi-user (MU) packet, in accordance with certain aspects of the present disclosure.

To provide the MAC address context of a group ID, there are several options. One option is that MU transmissions from STAs may be preceded by a short primer frame that defines the MAC address of the sender of the MU transmission (i.e., of the STA). FIG. 6 illustrates a primer frame 600 preceding a MU packet 602, in accordance with certain aspects of the present disclosure. The primer frame 600 may set a context for the packet 602 that follows a short period (e.g., a short interframe space (SIFS) 604) after the primer frame, or for the entire transmission opportunity (TXOP) that follows a short period after the primer frame. The context may be reset when a gap occurs that is longer than a relatively long period, such as a point coordination function (PCF) interframe space (PIFS).

The primer frame may define the context in which the group ID is to be interpreted. For certain aspects, the primer frame may be a newly defined control frame, while for other aspects, the primer frame may be a newly defined control extension control frame. For other aspects, the primer frame may be a CTS-to-self frame, in which case the fact that the Clear-to-Send (CTS) frame functions as a primer frame becomes clear when the CTS message is followed by a MU transmission. Alternatively, small modifications to existing fields may indicate that the CTS frame is a primer frame that sets a group ID context.

The context set by the primer frame may be the MAC address of the STA. The MAC address is a unique identifier of a STA, thereby unambiguously identifying how to interpret the group ID. When a MU packet is received without a prior primer frame (i.e., the MU packet is not immediately preceded by a corresponding primer frame), the receiving STA may assume that the MU packet was sent by the AP (i.e., the default context for interpreting the group ID is the AP).

The primer frame may also identify which STAs are addressed in the MU packet and on what spatial streams. The STAs may be identified by an association identifier (AID), in which case a MAC address may most likely be present in the primer frame to set a BSS context in which the AID is to be interpreted. The MAC address may be a basic service set identifier (BSSID), which is the MAC address of the AP to which the STAs are associated, or the MAC address may be the STA address, in which case the receiving STAs may most likely check whether a direct link exists with that MAC address.

Figure 7:
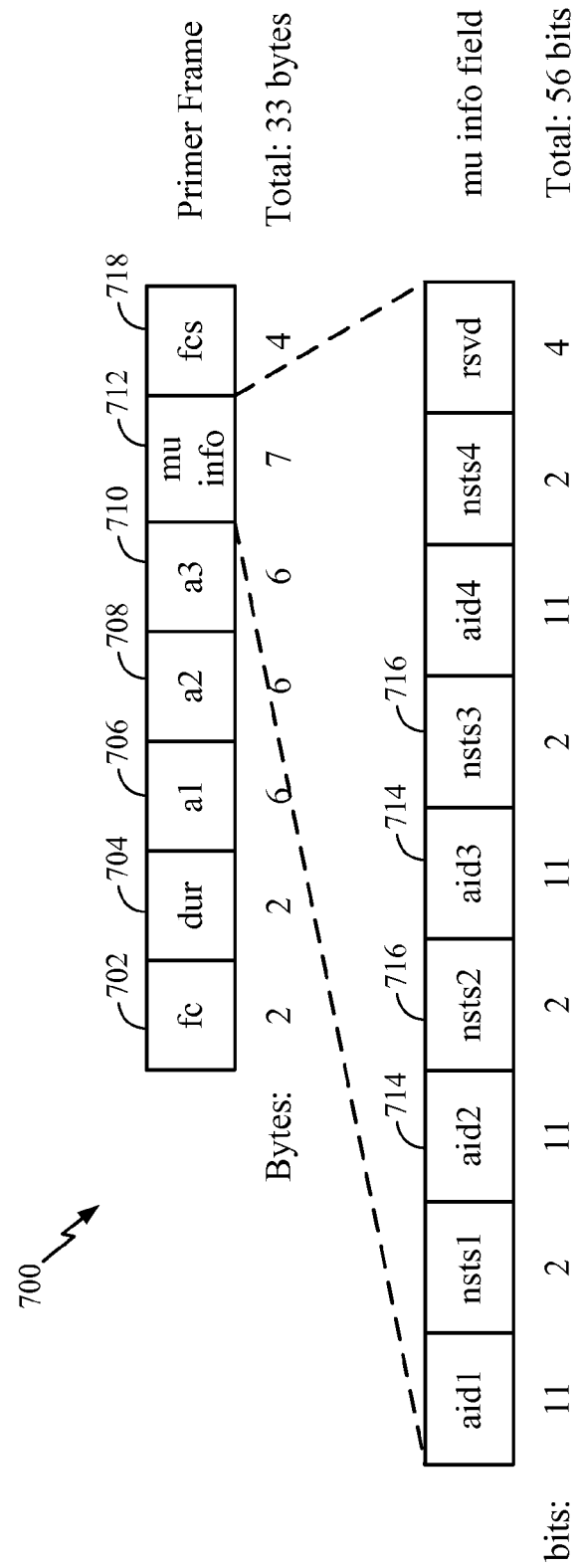
FIG. 7 illustrates an example primer frame using an association identifier (AID) for each of the STAs addressed in the MU packet, in accordance with certain aspects of the present disclosure.

FIG. 7 illustrates an example primer frame 700 that contains the AIDs of the addressed STAs. The frame control (FC) field 702 may indicate that this is a control (extension) frame of type "primer frame." The duration field 704 may indicate a possible duration of the frame exchange. The a1 field 706 may contain the broadcast address as the receiver address (RA). The a2 field 708 may contain the MAC address of the STA sending the primer frame 700 as the transmitter address (TA).

The a3 field 710 may contain the BSSID. The a3 field 710 may be omitted from this frame because the a2 field 708 unambiguously sets the context for the pending MU transmission. The MU info field 712 may comprise several repetitions of an AID field 714 and a number of spatial streams (Nsts) field 716, one for each STA in the MU transmission (this example shows four STAs). When less than four STAs are addressed in the pending MU transmission, non-used AID subfields may be set to a non-existent AID. The Nsts fields 716 may be reused from the preamble, which already contains an Nsts field. The MU info field 712 may be followed by a frame check sequence (FCS) field 718.

The AID is the identifier the STA receives upon associating with the AP. However, the identifier used for MU-MIMO may be a specific multi-user identifier (MID) that is assigned by the AP or STA upon association or upon formation of a direct link, respectively. An MID may be much shorter than an AID.

A shorter version of a primer frame 800 based on two addresses and MIDs is shown in FIG. 8. The FC field 802 may indicate that this is a control (extension) frame of type "primer frame." The duration field 804 may indicate a possible duration of the frame exchange. The a1 field 806 may contain the broadcast address as the receiver address (RA). The a2 field 808 may contain the MAC address of the STA sending the primer frame 800 as the transmitter address (TA). The MU info field 810 may comprise several repetitions of a MID field 812 and an Nsts field 814, one for each STA in the MU transmission (this example shows four STAs). When less than four STAs are addressed in the pending MU transmission, non-used MID subfields may be set to a non-existent MID. The Nsts fields 814 may be reused from the preamble, which already contains an Nsts field. The MU info field 810 may be followed by an FCS field 816.

The MID subfield in this example is 4 bits wide, which means that 16 STAs may be addressed via MU transmissions at any given time. When other STAs are to be included in MU transmissions and all 16 MIDs have been assigned, the STA may most likely revoke MIDs from some STAs and assign these to others. This can be a dynamic process, which is easy to manage since a STA is in charge of its own assignments (i.e., the MID makes sense only within the context of a given STA).

A STA may use action frames encapsulated in TDLS frames to manage MID assignments. When AIDs are used, signaling between peer STAs need not be performed, because the primer frame uses identifiers that are readily available at each STA (i.e., this method is stateless from the perspective of the STA utilizing MU to other STAs).

For other aspects as an option to the primer frame, the MAC address of the STA may be added to the PHY preamble of MU transmissions. The MAC address may be located after the existing VHT-SIG-A field and before the training fields for certain aspects. The presence of a group ID context field (i.e., a MAC address) may be signaled through a portion (e.g., existing bits) of the L-SIG field. The currently defined MU preamble without a group ID context may still be used in this case. The presence of a group ID context may also be signaled by setting the group ID to a MU value (i.e., any value except all zeroes and all ones). The currently defined MU preamble without a group ID context may no longer be used in this case, which means that this option would not be backwards compatible with the currently defined MU preamble.

For certain aspects, the primer frame may be defined to announce a temporary group ID and group assignment. FIG. 9 illustrates an example primer frame 900 for announcing a temporary group ID and group assignment. The MAC layer may program the temporary group ID into the PHY during the SIFS time between the primer frame 900 and the MU transmission. The original group ID may autonomously be restored by the PHY at the end of the MU packet when a valid MU transmission starts within SIFS after the primer frame 900, or after SIFS+x µs otherwise (the MAC may provide the timeout so that the PHY need not be aware of SIFS timing). The value x may be on the order of several µs.

Figure 10:
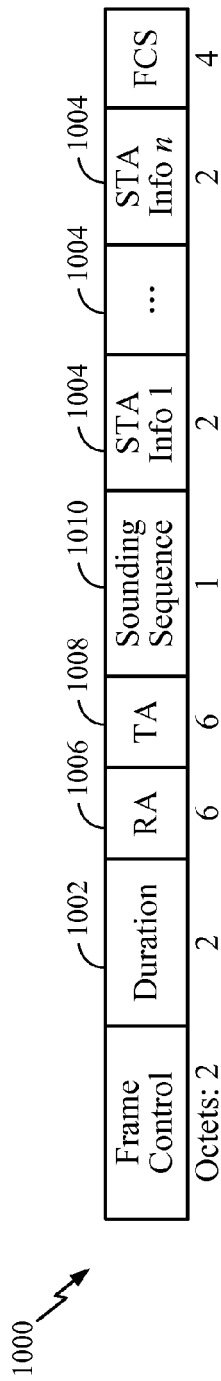
FIG. 10 illustrates a Null Data Packet Assignment (NDPA) frame functioning as a primer frame for a MU packet, in accordance with certain aspects of the present disclosure.

IEEE 802.11ac defines a Null Data Packet Announcement (NDPA) frame. The NDPA frame may be redefined to serve as a primer frame by redefining Sounding Sequence 0 to indicate that the frame is a primer frame and not an NDP announcement. FIG. 10 illustrates an example frame format for a redefined NDPA/primer frame 1000. For certain aspects, one bit of the Sounding Sequence field may be dedicated to switch between the NDPA and primer frame function, effectively cutting the Sounding Sequence range in half.

In the NDPA/primer frame 1000, the duration field 1002 may be set to an appropriate duration value. The NDPA/primer frame 1000 may include at least one STA Information (Info) field 1004. If the NDPA/primer frame 1000 comprises only one STA Info field 1004, then the RA field 1006 may be set to the address STA identified by the STA ID in the STA Info field. If the NDPA/primer frame 1000 comprises more than one STA Info field, then the RA field 1006 may be set to the broadcast address. The TA field 1008 may be set to the address of the STA transmitting the NDPA frame. The Sounding Sequence field 1010 may indicate a sequence number associated with the current sounding sequence. A sounding sequence equal to 0 may indicate that this is a primer frame (i.e., not a conventional NDPA frame) that precedes an MU transmission.

Figure 11:
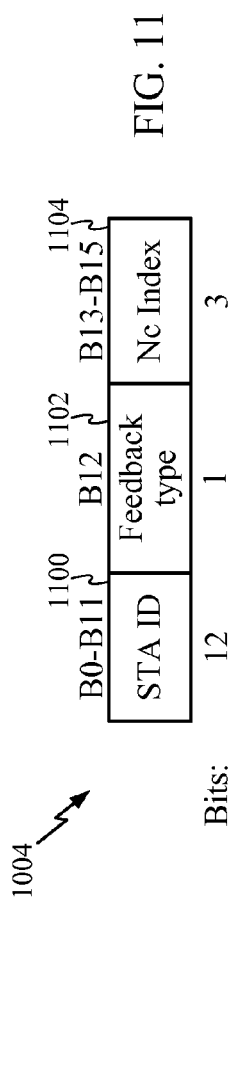
FIG. 11 illustrates an example STA information field in the NDPA frame of FIG. 10, in accordance with certain aspects of the present disclosure.

FIG. 11 illustrates an example format of the STA Info field 1004. The STA ID subfield 1100 may contain the AID or MID of the target STA. The Feedback Type subfield 1102 may indicate the type of feedback requested. The Feedback Type subfield 1102 may be set to 0 for single-user (SU) transmission and set to 1 for MU transmission. For Sounding Sequence 0, this field is reserved.

The Nc Index subfield 1104 may indicate the feedback dimension requested for MU feedback. The Nc Index subfield 1104 may be set to 0 to request Nc=1, set to 1 to request Nc=2, . . . , and set to 7 to request Nc=8. This subfield is reserved if the Feedback Type subfield 1102 is set to SU. For Sounding Sequence 0, this field indicates the number of spatial streams.

For certain aspects, the NDPA/primer frame 1000 may be used to temporarily define a reserved group ID. The reserved group ID may be known in advance by the STAs, so that the group ID need not be signaled as part of the primer frame. The reserved group ID may be signaled by the AP to STAs as part of the group ID allocations, or the reserved group ID may be defined in the IEEE 802.11ac standard (i.e., the standard defines that a certain group ID shall not be used by the AP because this group ID is intended for MU-MIMO transmissions by STAs).

Figure 12:
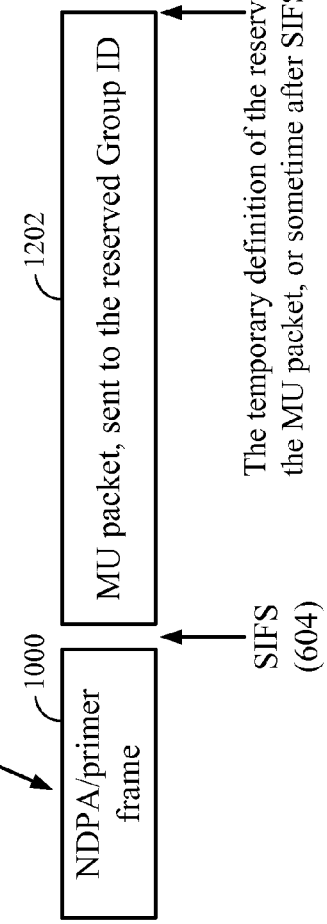
FIG. 12 illustrates an example NDPA frame functioning as a primer frame for announcing a temporary group ID, followed by a subsequent MU packet, in accordance with certain aspects of the present disclosure.

The NDPA/primer frame 1000 may provide a temporary definition of the reserved group ID, until the end of the MU packet when a valid MU transmission starts within SIFS after the primer frame, or after SIFS+x µs otherwise, where x may be several µs. The NDPA/primer frame 1000 may be followed by a MU transmission 1202 with a PHY header that indicates the reserved group ID as illustrated in FIG. 12. The Nsts field may indicate the spatial stream assignment (i.e., the spatial stream allocations) for each STA in the temporary definition of the reserved group ID.

When a reserved group ID is used as described above, the spatial stream allocation may be supplied via the Nsts field in the PHY header of the MU packet, as is the case for normal operation based on the group ID. This implies that the spatial stream allocation need not be allocated by the Nc Index field of the NDPA frame with Sounding Sequence 0. In this case, the Nc Index subfield may indicate the feedback dimension requested for MU feedback. The Nc Index subfield may be set to 0 to request Nc=1, set to 1 to request Nc=2, . . . , and set to 7 to request Nc=8. This subfield may be reserved if the Feedback Type field is set to SU. For Sounding Sequence 0, this field is reserved.

Figure 13:
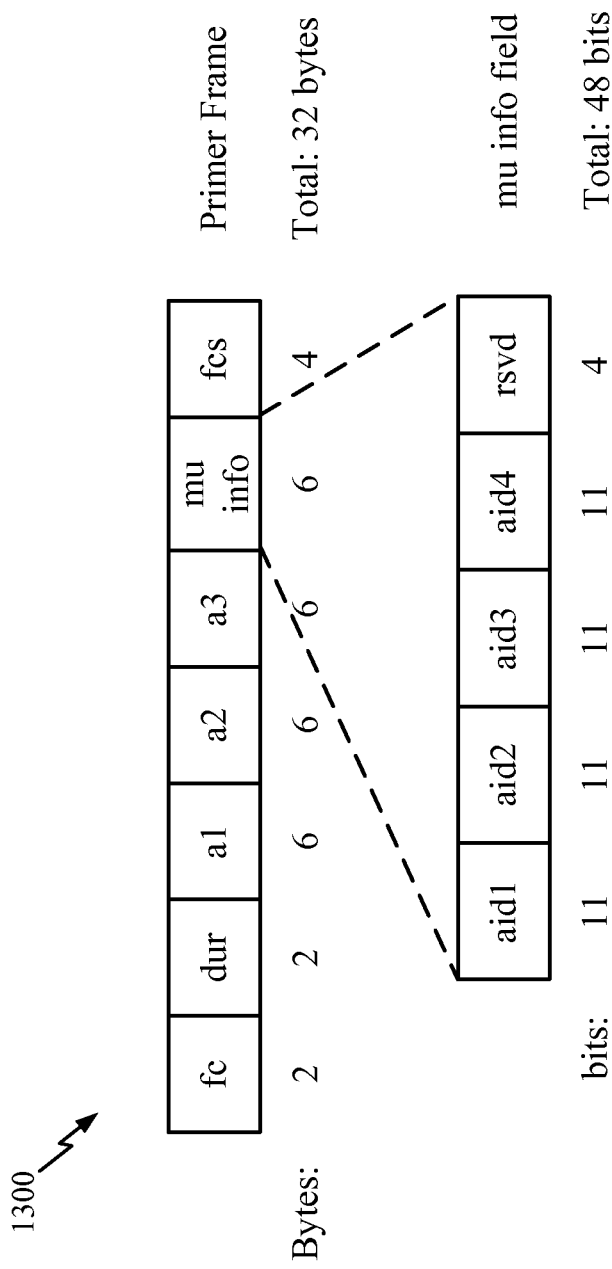
FIG. 13 illustrates an example control or management action frame functioning as a primer frame that provides a temporary definition of a reserved group ID, in accordance with certain aspects of the present disclosure.

Rather than redefining the NDPA frame with Sounding Sequence 0 to be a primer frame, a dedicated control or management action frame may be defined that provides the temporary definition of the reserved group ID. FIG. 13 illustrates an example group ID definition frame 1300 with AIDs.

FIG. 14 illustrates an example group ID definition frame 1400 with MAC address fields 1402. A more efficient group ID definition frame 1500 with MAC address fields 1502 is illustrated in FIG. 15. In frame 1500, the regular addresses a2 and a3 have been redefined as MAC addresses for the group ID assignment. The a1 address 1504 may contain the broadcast address or a group address. The advantage of using plain MAC addresses instead of AIDs is that MAC addresses do not depend on a BSSID to define them (as opposed to AIDs), which allows the primer frame to assign STAs that are not in the same BSS. The FC field may define the frame 1500 as a primer frame (i.e., a group ID definition frame).

Figure 16:
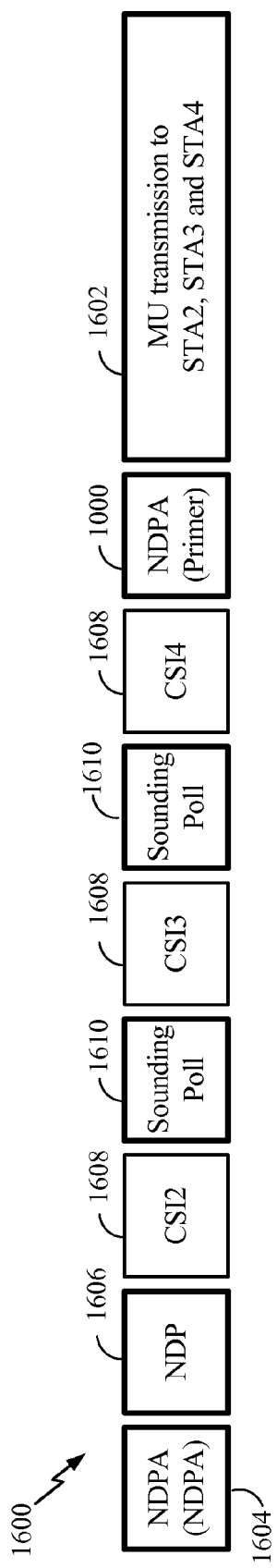
FIG. 16 illustrates an example MU frame exchange with sounding based on an NDPA frame functioning as a primer frame, in accordance with certain aspects of the present disclosure.

FIG. 16 illustrates an example MU frame exchange 1600 with sounding based on an NDPA frame functioning as a primer frame (i.e., an NDPA/primer frame 1000). As described above, the NDPA/primer frame 1000 may define the context in which the group ID is to be interpreted for the subsequent MU transmission 1602. Prior to a first STA capable of direct link transmissions (e.g., STA1 in FIG. 5) transmitting the NDPA/primer frame 1000, the MU frame exchange 1600 may include the first STA transmitting an NDPA frame 1604 functioning as an NDP announcement, followed by an NDP frame 1606. A second STA (e.g., STA2 in FIG. 5) may respond to the NDP frame 1606 with a channel state information (CSI) frame 1608 (e.g., CSI2). Then, the first STA may transmit sounding poll frames 1610, and other STAs (e.g., STA3 and STA4 in FIG. 5) may respond with CSI frames 1608 (CSI3 and CSI4) before the first STA transmits the NDPA/primer frame 1000 and the MU transmission 1602 (to STA2, STA3, and STA4). Although three STAs (STA2, STA3, and STA4) are involved in the example MU frame exchange 1600, the idea may be extended to exchanges with fewer or more STAs.

Figure 17:
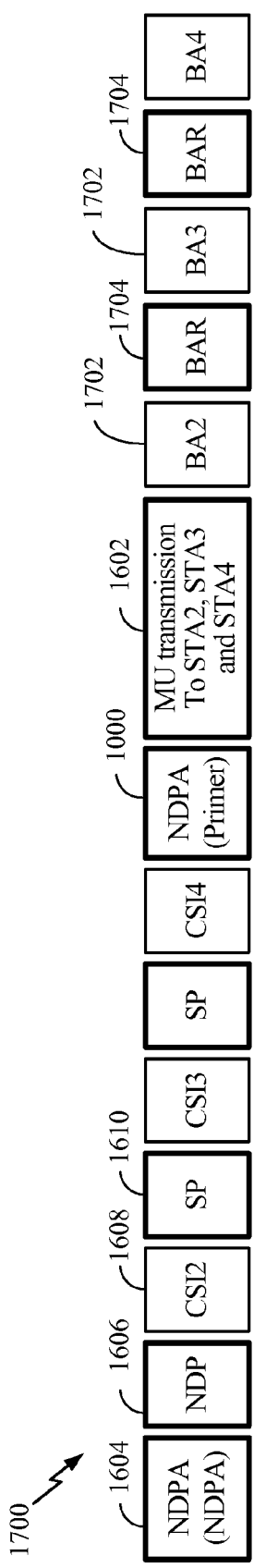
FIG. 17 illustrates an example MU frame exchange with block acknowledgment (BA) and sounding based on an NDPA frame functioning as a primer frame, in accordance with certain aspects of the present disclosure.

FIG. 17 illustrates an example MU frame exchange 1700 with block acknowledgment (BA) and sounding based on an NDPA/primer frame 1000. The MU frame exchange 1700 is similar to the MU frame exchange 1600 of FIG. 16, with the addition of the BA frames 1702 (e.g., BA2, BA3, and BA4) and block acknowledgment request (BAR) frames 1704 transmitted after the MU transmission 1602.

Figure 18:
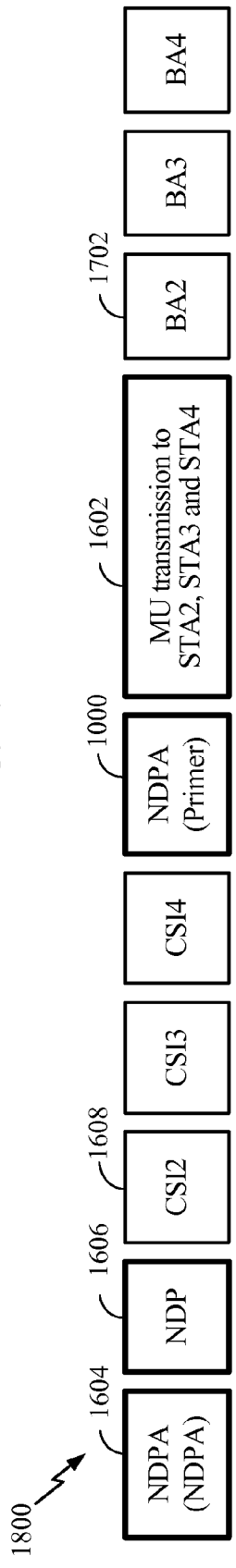
FIG. 18 illustrates an example MU frame exchange with BA and sounding based on sequential access, in accordance with certain aspects of the present disclosure.

FIG. 18 illustrates an example MU frame exchange 1800 with BA and sounding based on sequential access and using an NDPA/primer frame 1000. The MU frame exchange 1800 is similar to the MU frame exchange 1700 of FIG. 17, except that additional sounding poll frames 1610 (other than the NDP frame 1606) or BAR frames 1704 are not transmitted in a sequential access procedure.

Figure 19:
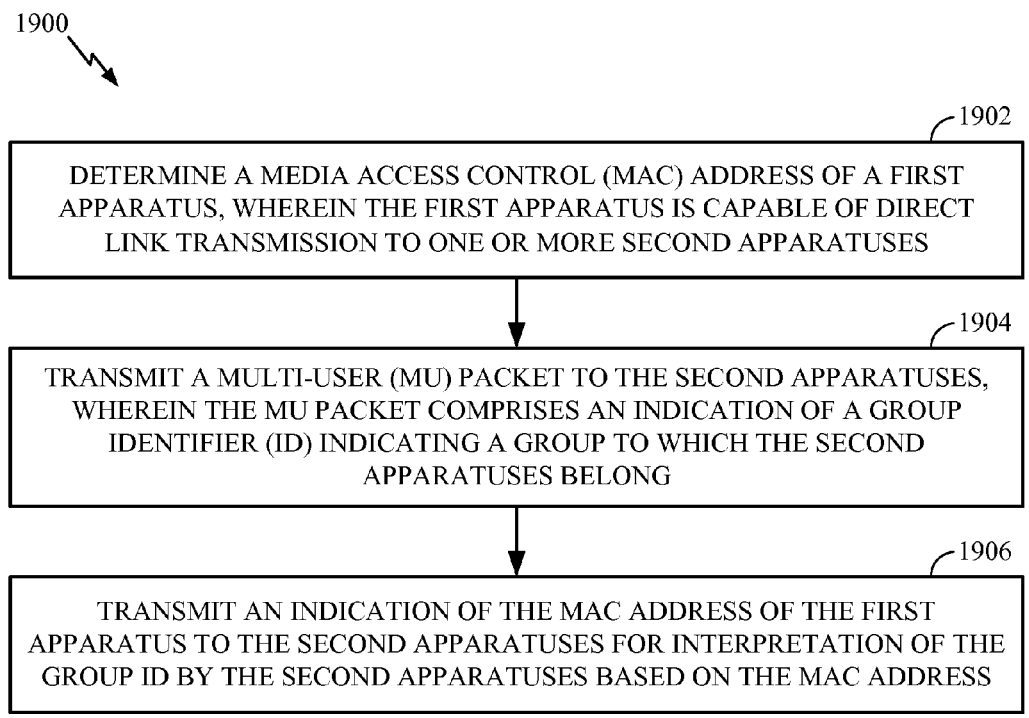
FIG. 19 illustrates example operations, that may be performed at a first apparatus capable of direct link transmission to one or more second apparatuses, to transmit a MU packet with an indication of a group ID for the second apparatuses and to transmit a MAC address of the first apparatus for interpretation of the group ID by the second apparatuses, in accordance with certain aspects of the present disclosure.

FIG. 19 illustrates example operations 1900—that may be performed at a first apparatus (e.g., a STA) capable of direct link transmission to one or more second apparatuses (e.g., other STAs)—to transmit a MU packet with an indication of a group ID for the second apparatuses and to transmit a MAC address of the first apparatus for interpretation of the group ID by the second apparatuses, in accordance with certain aspects of the present disclosure. The operations 1900 may begin, at 1902, with the first apparatus determining a MAC address of the first apparatus. At 1904, the first apparatus may transmit a MU packet to the second apparatuses, wherein the MU packet comprises an indication of a group ID indicating a group to which the second apparatuses belong. At 1906, the first apparatus may transmit an indication of the MAC address of the first apparatus to the second apparatuses for interpretation of the group ID by the second apparatuses based on the MAC address.

According to certain aspects, the first apparatus may transmit the indication of the MAC address in a frame (e.g., a primer frame) transmitted prior to the MU packet. The frame may be at least one of a control frame or a control extension control frame. For certain aspects, the frame may be a clear-to-send (CTS) frame. For certain aspects, the frame may include, for each of the second apparatuses associated with the group ID, an indication of an association identifier (AID) and an indication of a number of spatial streams. For other aspects, the frame may include, for each of the second apparatuses associated with the group ID, an indication of a multi-user identifier (MID) assigned by the first apparatus upon formation of a direct link (i.e., if a direct link is established between the first apparatus and the at least one of the second apparatuses) and an indication of a number of spatial streams. The frame may include an indication of a temporary group ID indicating the group to which the second apparatuses belong for the MU packet. The frame may include an indication of a MAC address for each of the second apparatuses associated with the group ID. For certain aspects, the frame may be a redefined null data packet announcement (NDPA) frame. A bit in a sounding sequence field of the NDPA frame may indicate that the frame is not a conventional NDPA frame (e.g., does not announce a null data packet (NDP)).

According to other aspects, the first apparatus may transmit the indication of the MAC address in a preamble of the MU packet. For certain aspects, the indication of the MAC address may be located after a very high throughput (VHT) signal A (VHT-SIG-A) field and before training fields in the preamble. A portion of a legacy signal (L-SIG) field in the preamble may signal that the indication of the MAC address is included in the preamble.

Figure 20:
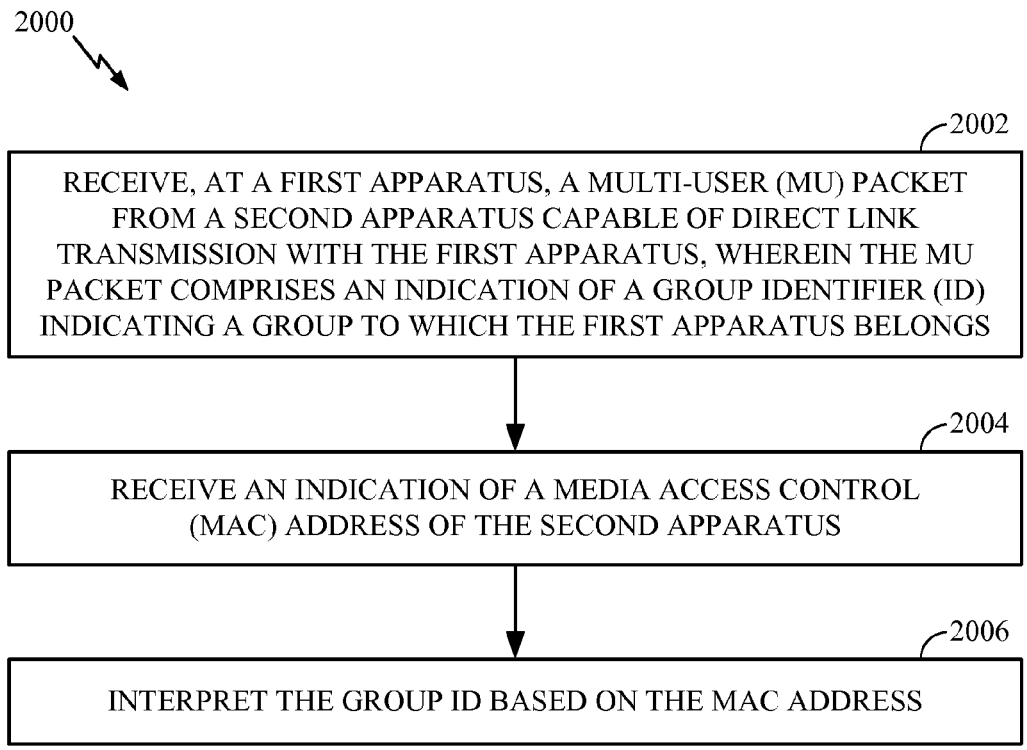
FIG. 20 illustrates example operations—which may be performed at a first apparatus capable of receiving a direct link transmission from a second apparatus—for interpreting a group ID, received in a MU packet and indicating a group to which the first apparatus belongs, based on a received MAC address of the second apparatus, in accordance with certain aspects of the present disclosure.
Figure 20A:
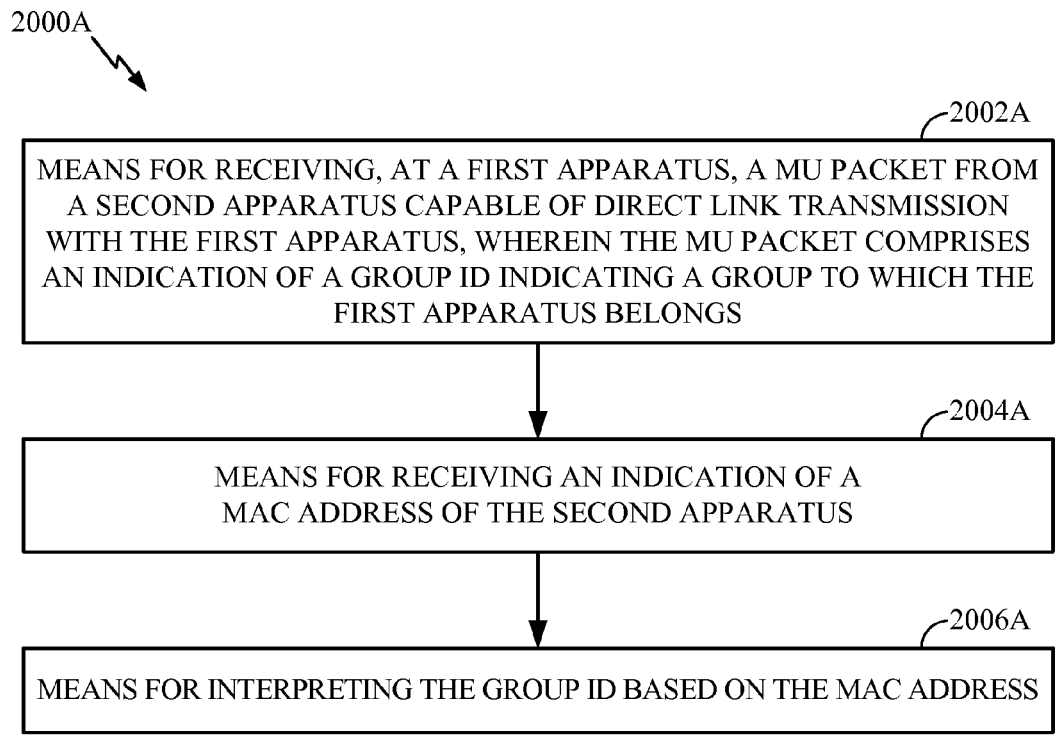
FIG. 20A illustrates example means capable of performing the operations shown in FIG. 20.

FIG. 20 illustrates example operations 2000—that may be performed at a first apparatus (e.g., a first STA) capable of receiving a direct link transmission from a second apparatus (e.g., a second STA)—to interpret a group ID, received in a MU packet and indicating a group to which the first apparatus belongs, based on a received MAC address of the second apparatus, in accordance with certain aspects of the present disclosure. The operations 2000 may begin, at 2002, with the first apparatus receiving a MU packet from a second apparatus capable of direct link transmission with the first apparatus, wherein the MU packet comprises an indication of a group ID indicating a group to which the first apparatus belongs. At 2004, the first apparatus may receive an indication of a MAC address of the second apparatus. At 2006, the first apparatus may interpret the group ID based on the MAC address.

According to certain aspects, the first apparatus may receive a message from the second apparatus, the message indicating assignment of the first apparatus to the group and indicating, for the group ID, a spatial stream associated with the first apparatus in subsequent MU packets to be transmitted to the group from the second apparatus. In this case, the first apparatus may interpret the group ID at 2006 by determining that the MAC address is associated with the second apparatus, such that the MU packet was transmitted by the second apparatus and the group ID is associated with the second apparatus. For certain aspects, the first apparatus may decode the MU packet using the spatial stream associated with the group ID for the first apparatus. For certain aspects, the assignment of the first apparatus to the group may be considered as being valid for at most a duration of the MU packet. For other aspects, the assignment of the first apparatus to the group may be considered as being valid until a gap occurs that is longer than a point coordination function (PCF) interframe space (PIFS).

According to certain aspects, the first apparatus may receive the indication of the MAC address at 2004 in a preamble of the MU packet. For certain aspects, a portion of a legacy signal (L-SIG) field in the preamble may signal that the indication of the MAC address is included in the preamble. In this case, the first apparatus may locate the indication of the MAC address in the preamble based on the portion of the L-SIG field.

According to certain aspects, the first apparatus may receive the indication of the MAC address at 2004 in a frame received prior to the MU packet. For certain aspects, the first apparatus may receive another MU packet comprising an indication of another group ID indicating another group to which the first apparatus belongs, wherein the other MU packet is not immediately preceded by another frame with another MAC address; may determine that the other MU packet was transmitted by an access point (AP); and may interpret the other group ID as assigned by the AP. For other aspects, the first apparatus may receive another MU packet comprising an indication of another group ID indicating another group to which the first apparatus belongs; may receive an indication of a Basic Service Set Identifier (BSSID) in another frame received prior to the other MU packet; and may interpret the other group ID based on the BSSID.

Figure 21:
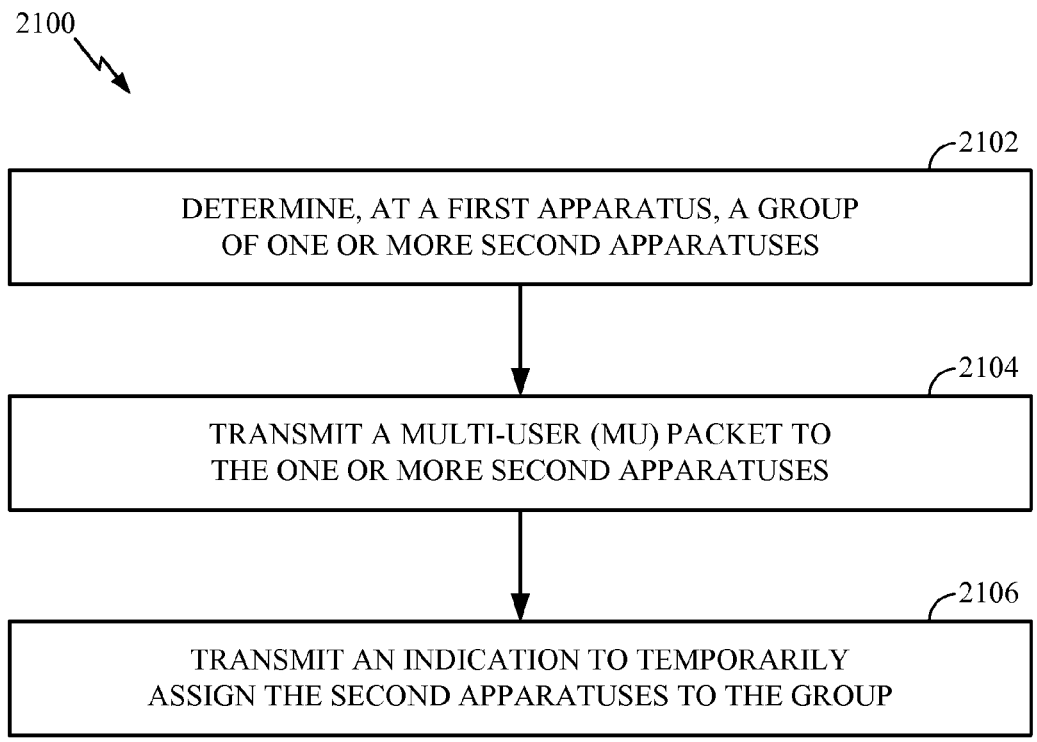
FIG. 21 illustrates example operations, which may be performed at a first apparatus capable of direct link transmission to one or more second apparatuses, for transmitting a MU packet to the second apparatuses and for transmitting an indication to temporarily assign the second apparatuses to the group, in accordance with certain aspects of the present disclosure.
Figure 21A:
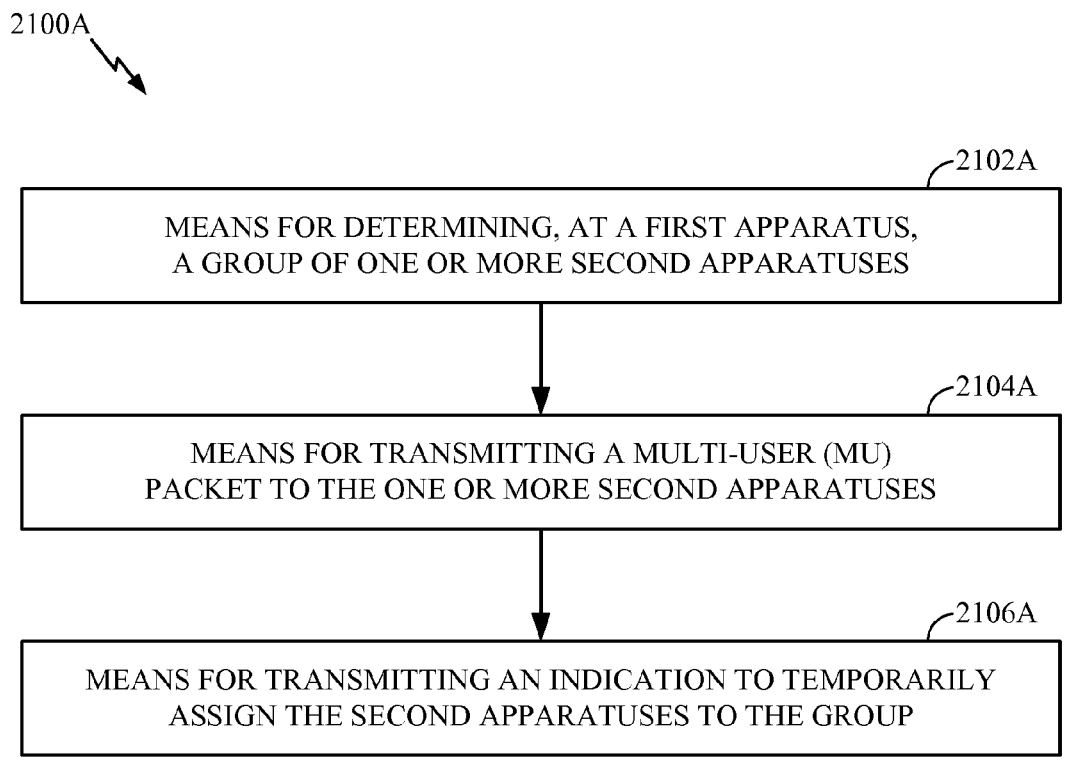
FIG. 21A illustrates example means capable of performing the operations shown in FIG. 21.

FIG. 21 illustrates example operations 2100—that may be performed at a first apparatus (e.g., a STA) capable of direct link transmission to one or more second apparatuses (e.g., other STAs)—to transmit a MU packet to the second apparatuses and to transmit an indication to temporarily assign the second apparatuses to the group. The operations 2100 may begin, at 2102, with the first apparatus determining a group of one or more second apparatuses. At 2104, the first apparatus may transmit a MU packet to the one or more second apparatuses. For certain aspects, the MU packet may include an indication of a group ID, indicating the group to which the second apparatuses belong. For certain aspects, a preamble of the MU packet may include an indication of a MAC address of the first apparatus.

At 2106, the first apparatus may transmit an indication to temporarily assign the second apparatuses to the group. For certain aspects, the first apparatus may transmit the indication prior to the transmission of the MU packet. For certain aspects, the second apparatuses may be temporarily assigned to the group for at most a duration of the packet.

According to certain aspects, the indication (to temporarily assign the second apparatuses to the group) may include an identifier of each of the second apparatuses. For certain aspects, this identifier may comprise at least one of an association identifier (AID), a multi-user identifier (MID), or a MAC address. For certain aspects, the indication may comprise an indication of a spatial stream assignment for each of the second apparatuses. For certain aspects, the indication may comprise an indication of a group ID, indicating the group to which the second apparatuses belong. The MU packet may include another indication of the group ID and/or an indication of a spatial stream assignment for each of the second apparatuses.

According to certain aspects, the indication (to temporarily assign the second apparatuses to the group) may include an indication of a receiver address that is a group address. For certain aspects, the indication may include an indication of a basic service set identifier (BSSID). For certain aspects, the indication may include an indication of a MAC address of the first apparatus.

Figure 19A:
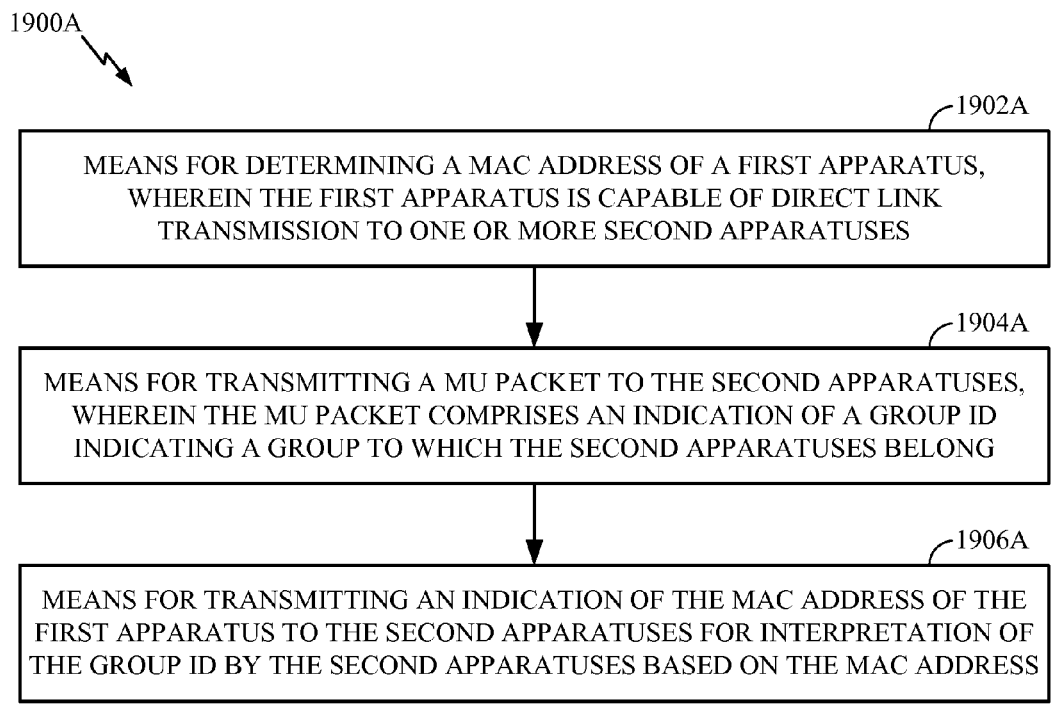
FIG. 19A illustrates example means capable of performing the operations shown in FIG. 19.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1900 illustrated in FIG. 19 correspond to means 1900A illustrated in FIG. 19A.

For example, means for transmitting may comprise a transmitter, such as the transmitter unit 254 of the user terminal 120 depicted in FIG. 2 or the transmitter 310 of the wireless device 302 shown in FIG. 3. Means for receiving may comprise a receiver, such as the receiver unit 254 of the user terminal 120 depicted in FIG. 2 or the receiver 312 of the wireless device 302 shown in FIG. 3. Means for processing, means for determining, means for restoring, means for decoding, means for considering, means for locating, and/or means for interpreting may comprise a processing system, which may include one or more processors, such as the RX data processor 270, the TX data processor 288, and/or the controller 280 of the user terminal 120 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A first apparatus for wireless communications, comprising:
  a processing system configured to determine a media access control (MAC) address of the first apparatus; and
  a transmitter configured to:
    transmit a multi-user (MU) packet to one or more second apparatuses, wherein the MU packet comprises an indication of a group identifier (ID) indicating a group to which the one or more second apparatuses belong; and
    transmit an indication of the MAC address of the first apparatus to the one or more second apparatuses for interpretation of the group ID, wherein the transmitter is configured to transmit the indication of the MAC address in a preamble of the MU packet and wherein the indication of the MAC address is located after a very high throughput (VHT) signal A (VHT-SIG-A) field and before training fields in the preamble.

2. The first apparatus of claim 1, wherein the frame comprises, for at least one of the one or more second apparatuses associated with the group ID:
  an indication of a number of spatial streams; and
  an indication of an association identifier (AID) or an indication of a multi-user identifier (MID) assigned by the first apparatus if a direct link is established between the first apparatus and the at least one of the one or more second apparatuses.

3. The first apparatus of claim 1, wherein the frame comprises an indication of a temporary group ID indicating the group to which the one or more second apparatuses belong for the MU packet.

4. The first apparatus of claim 1, wherein the frame is a redefined null data packet announcement (NDPA) frame, and wherein a bit in a sounding sequence field of the redefined NDPA frame indicates that the frame is not a conventional NDPA frame.

5. The first apparatus of claim 1, wherein the frame comprises an indication of a MAC address for each of the one or more second apparatuses associated with the group ID.

6. A method for wireless communications, comprising:
  determining a media access control (MAC) address of a first apparatus;
  transmitting a multi-user (MU) packet to one or more second apparatuses, wherein the MU packet comprises an indication of a group identifier (ID) indicating a group to which the one or more second apparatuses belong; and
  transmitting an indication of the MAC address of the first apparatus to the one or more second apparatuses for interpretation of the group ID, wherein transmitting the indication of the MAC address comprises transmitting the indication of the MAC address in a preamble of the MU packet and wherein the indication of the MAC address is located after a very high throughput (VHT) signal A (VHT-SIG-A) field and before training fields in the preamble.

7. The method of claim 6, wherein the frame comprises, for at least one of the one or more second apparatuses associated with the group ID:
  an indication of a number of spatial streams; and
  an indication of an association identifier (AID) or an indication of a multi-user identifier (MID) assigned by the first apparatus if a direct link is established between the first apparatus and the at least one of the one or more second apparatuses.

8. The method of claim 6, wherein the frame comprises an indication of a temporary group ID indicating the group to which the one or more second apparatuses belong for the MU packet.

9. The method of claim 6, wherein the frame is a redefined null data packet announcement (NDPA) frame, and wherein a bit in a sounding sequence field of the redefined NDPA frame indicates that the frame is not a conventional NDPA frame.

10. The method of claim 6, wherein the frame comprises an indication of a MAC address for each of the one or more second apparatuses associated with the group ID.

11. A first apparatus for wireless communications, comprising:
  means for determining a media access control (MAC) address of the first apparatus; and
  means for transmitting a multi-user (MU) packet to one or more second apparatuses, wherein the MU packet comprises an indication of a group identifier (ID) indicating a group to which the one or more second apparatuses belong and wherein the means for transmitting is also configured to transmit an indication of the MAC address of the first apparatus to the one or more second apparatuses for interpretation of the group ID, wherein the means for transmitting is configured to transmit the indication of the MAC address in a preamble of the MU packet and wherein the indication of the MAC address is located after a very high throughput (VHT) signal A (VHT-SIG-A) field and before training fields in the preamble.

12. The first apparatus of claim 11, wherein the frame comprises, for at least one of the one or more second apparatuses associated with the group ID: an indication of a number of spatial streams; and an indication of an association identifier (AID) or an indication of a multi-user identifier (MID) assigned by the first apparatus if a direct link is established between the first apparatus and the at least one of the one or more second apparatuses.

13. The first apparatus of claim 11, wherein the frame comprises an indication of a temporary group ID indicating the group to which the one or more second apparatuses belong for the MU packet.

14. The first apparatus of claim 11, wherein the frame is a redefined null data packet announcement (NDPA) frame, and wherein a bit in a sounding sequence field of the redefined NDP A frame indicates that the frame is not a conventional NDP A frame.

15. The first apparatus of claim 11, wherein the frame comprises an indication of a MAC address for each of the one or more second apparatuses associated with the group ID.

16. A non-transitory computer-readable medium comprising instructions executable to:
determine a media access control (MAC) address of a first apparatus;
transmit a multi-user (MU) packet to one or more second apparatuses, wherein the MU packet comprises an indication of a group identifier (ID) indicating a group to which the one or more second apparatuses belong; and
transmit an indication of the MAC address of the first apparatus to the one or more second apparatuses for interpretation of the group ID, wherein the indication of the MAC address is transmitted in a preamble of the MU packet and wherein the indication of the MAC address is located after a very high throughput (VHT) signal A (VHT-SIG-A) field and before training fields in the preamble.

17. A wireless node, comprising:
at least one antenna;
a processing system configured to determine a media access control (MAC) address of the wireless node; and
a transmitter configured to:
transmit, via the at least one antenna, a multi-user (MU) packet to one or more apparatuses, wherein the MU packet comprises an indication of a group identifier (ID) indicating a group to which the one or more apparatuses belong; and
transmit, via the at least one antenna, an indication of the MAC address of the wireless node to the one or more apparatuses for interpretation of the group ID, wherein the indication of the MAC address is transmitted in a preamble of the MU packet and wherein the indication of the MAC address is located after a very high throughput (VHT) signal A (VHT-SIG-A) field and before training fields in the preamble.

18. A first apparatus for wireless communications, comprising:
a receiver configured to:
receive a multi-user (MU) packet from a second apparatus, wherein the MU packet comprises an indication of a group identifier (ID) indicating a group to which the first apparatus belongs; and
receive an indication of a media access control (MAC) address of the second apparatus, wherein the indication of the MAC address of the second apparatus is received in a preamble of the MU packet and wherein the indication of the MAC address is located after a very high throughput (VHT) signal A (VHT-SIG-A) field and before training fields in the preamble; and
a processing system configured to interpret the group ID based on the MAC address.

19. The first apparatus of claim 18, wherein the processing system is configured to interpret the group ID by determining that the MAC address is associated with the second apparatus, such that the MU packet was transmitted by the second apparatus and the group ID is associated with the second apparatus.

20. The first apparatus of claim 18, wherein the receiver is configured to receive a message from the second apparatus, the message indicating assignment of the first apparatus to the group and indicating, for the group ID, a spatial stream associated with the first apparatus in MU packets to be transmitted to the group from the second apparatus.

21. The first apparatus of claim 20, further comprising decoding the MU packet using the spatial stream associated with the group ID for the first apparatus.

22. The first apparatus of claim 20, wherein the processing system is further configured to consider the assignment of the first apparatus to the group as being valid for at most a duration of the MU packet or until a gap occurs that is longer than a point coordination function (PCF) interframe space (PIFS).

23. The first apparatus of claim 18, wherein the receiver is further configured to receive another MU packet comprising an indication of another group ID indicating another group to which the first apparatus belongs, wherein the other MU packet is not immediately preceded by another frame with another MAC address, and wherein the processing system is configured to:
determine that the other MU packet was transmitted by an access point (AP); and
interpret the other group ID as assigned by the AP.

24. The first apparatus of claim 18, wherein the receiver is further configured to:
receive another MU packet comprising an indication of another group ID indicating another group to which the first apparatus belongs; and
receive an indication of a Basic Service Set Identifier (BSSID) in another frame received prior to the other MU packet, wherein the processing system is configured to interpret the other group ID based on the BSSID.

25. A method for wireless communications, comprising:
receiving, at a first apparatus, a multi-user (MU) packet from a second apparatus, wherein the MU packet comprises an indication of a group identifier (ID) indicating a group to which the first apparatus belongs; receiving an indication of a media access control (MAC) address of the second apparatus, wherein the indication of the MAC address of the second apparatus is received in a preamble of the MU packet and wherein the indication of the MAC address is located after a very high throughput (VHT) signal A (VHT-SIG-A) field and before training fields in the preamble; and interpreting the group ID based on the MAC address.

26. The method of claim 25, wherein the interpreting comprises interpreting the group ID by determining that the MAC address is associated with the second apparatus, such that the MU packet was transmitted by the second apparatus and the group ID is associated with the second apparatus.

27. The method of claim 25, further comprising receiving a message from the second apparatus, the message indicating assignment of the first apparatus to the group and indicating, for the group ID, a spatial stream associated with the first apparatus in MU packets to be transmitted to the group from the second apparatus.

28. The method of claim 27, further comprising decoding the MU packet using the spatial stream associated with the group ID for the first apparatus.

29. The method of claim 27, further comprising considering the assignment of the first apparatus to the group as being valid for at most a duration of the MU packet or until a gap occurs that is longer than a point coordination function (PCF) interframe space (PIFS).

30. The method of claim 25, wherein the method further comprises:
receiving another MU packet comprising an indication of another group ID indicating another group to which the first apparatus belongs, wherein the other MU packet is not immediately preceded by another frame with another MAC address;
determining that the other MU packet was transmitted by an access point (AP); and
interpreting the other group ID as assigned by the AP.

31. The method of claim 25, wherein the method further comprises:
receiving another MU packet comprising an indication of another group ID indicating another group to which the first apparatus belongs;
receiving an indication of a Basic Service Set Identifier (BSSID) in another frame received prior to the other MU packet; and
interpreting the other group ID based on the BSSID.

32. A first apparatus for wireless communications, comprising:
means for receiving a multi-user (MU) packet from a second apparatus, wherein the MU packet comprises an indication of a group identifier (ID) indicating a group to which the first apparatus belongs and wherein the means for receiving is also configured to receive an indication of a media access control (MAC) address of the second apparatus, wherein the indication of the MAC address of the second apparatus is received in a preamble of the MU packet and wherein the indication of the MAC address is located after a very high throughput (VHT) signal A (VHT-SIG-A) field and before training fields in the preamble; and
means for interpreting the group ID based on the MAC address.

33. The first apparatus of claim 32, wherein the means for interpreting is configured to interpret the group ID by determining that the MAC address is associated with the second apparatus, such that the MU packet was transmitted by the second apparatus and the group ID is associated with the second apparatus.

34. The first apparatus of claim 32, wherein the means for receiving is configured to receive a message from the second apparatus, the message indicating assignment of the first apparatus to the group and indicating, for the group ID, a spatial stream associated with the first apparatus in MU packets to be transmitted to the group from the second apparatus.

35. The first apparatus of claim 34, further comprising means for decoding the MU packet using the spatial stream associated with the group ID for the first apparatus.

36. The first apparatus of claim 34, further comprising means for considering the assignment of the first apparatus to the group as being valid for at most a duration of the MU packet or until a gap occurs that is longer than a point coordination function (PCF) interframe space (PIFS).

37. The first apparatus of claim 32, wherein the means for receiving is configured to:
receive another MU packet comprising an indication of another group ID indicating another group to which the first apparatus belongs, wherein the other MU packet is not immediately preceded by another frame with another MAC address, and wherein the first apparatus further comprises:
means for determining that the other MU packet was transmitted by an access point (AP); and
means for interpreting the other group ID as assigned by the AP.

38. The first apparatus of claim 32, wherein the means for receiving is configured to:
receive another MU packet comprising an indication of another group ID indicating another group to which the first apparatus belongs; and
receive an indication of a Basic Service Set Identifier (BSSID) in another frame received prior to the other MU packet and wherein the means for interpreting is configured to interpret the other group ID based on the BSSID.

39. A non-transitory computer-readable medium comprising instructions executable to:
receive, at a first apparatus, a multi-user (MU) packet from a second apparatus, wherein the MU packet comprises an indication of a group identifier (ID) indicating a group to which the first apparatus belongs;
receive an indication of a media access control (MAC) address of the second apparatus, wherein the indication of the MAC address of the second apparatus is received in a preamble of the MU packet and wherein the indication of the MAC address is located after a very high throughput (VHT) signal A (VHT-SIG-A) field and before training fields in the preamble; and
interpret the group ID based on the MAC address.

40. A wireless node, comprising: at least one antenna; a receiver configured to: receive, via the at least one antenna, a multi-user (MU) packet from an apparatus, wherein the MU packet comprises an indication of a group identifier (ID) indicating a group to which the wireless node belongs; and receive, via the at least one antenna, an indication of a media access control (MAC) address of the apparatus, wherein the indication of the MAC address of the apparatus is received in a preamble of the MU packet and wherein the indication of the MAC address is located after a very high throughput (VHT) signal A (VHT-SIG-A) field and before training fields in the preamble; and a processing system configured to interpret the group ID based on the MAC address.

* * * * *